(12) United States Patent
Fleming et al.

(10) Patent No.: US 9,577,864 B2
(45) Date of Patent: Feb. 21, 2017

(54) METHOD AND APPARATUS FOR USE WITH RECEIVED ELECTROMAGNETIC SIGNAL AT A FREQUENCY NOT KNOWN EXACTLY IN ADVANCE

(71) Applicant: Proteus Digital Health, Inc., Redwood City, CA (US)

(72) Inventors: Robert Alan Fleming, Nicasio, CA (US); Cherie Elaine Kushner, Nicasio, CA (US); William McAllister, Saratoga, CA (US); Mark Zdeblick, Portola Valley, CA (US)

(73) Assignee: Proteus Digital Health, Inc., Redwood City, CA (US)

( * ) Notice: Subject to any disclaimer, the term of this patent is extended or adjusted under 35 U.S.C. 154(b) by 0 days.

(21) Appl. No.: 14/917,834

(22) PCT Filed: Oct. 3, 2013

(86) PCT No.: PCT/IB2013/059084
§ 371 (c)(1),
(2) Date: Mar. 9, 2016

(87) PCT Pub. No.: WO2015/044722
PCT Pub. Date: Apr. 2, 2015

(65) Prior Publication Data
US 2016/0226697 A1    Aug. 4, 2016

Related U.S. Application Data

(60) Provisional application No. 61/881,555, filed on Sep. 24, 2013.

(51) Int. Cl.
*H04L 27/34* (2006.01)
*H04B 1/00* (2006.01)
(Continued)

(52) U.S. Cl.
CPC ..... *H04L 27/3416* (2013.01); *G06F 17/30312* (2013.01); *H04B 1/0003* (2013.01); *H04L 27/361* (2013.01)

(58) Field of Classification Search
CPC .............. H04L 7/06; H04L 7/08; H04L 25/08; H04L 7/042; H04L 27/148; H04L 27/144; H04L 27/2663; H04B 1/71637; H04B 10/60; H04B 1/7172; H04B 1/7183; H04B 2001/71563; H04B 1/001; H04B 1/10
(Continued)

(56) References Cited

U.S. PATENT DOCUMENTS 3,607,788 A    9/1971  Adolph
3,642,008 A    2/1972  Bolduc
(Continued)

FOREIGN PATENT DOCUMENTS

CN    1588649    3/2005
CN    1991868    7/2007
(Continued)

OTHER PUBLICATIONS

International Search Report and Written Opinion for PCT/IB2013/059084 dated Jun. 20, 2014 (7 pages).
(Continued)

*Primary Examiner* — Emmanuel Bayard
(74) *Attorney, Agent, or Firm* — Oppedahl Patent Law Firm LLC

(57) ABSTRACT

In a software receiver, a received electromagnetic signal is sampled in "slices", each having a duration of some multiple of a reference frequency. The samples of each slice are correlated with values in a pair of reference signals, such as sine and cosine, at the reference frequency. This yields a two-tuple for each slice, which two-tuples may be stored.
(Continued)

The stored two-tuples can be simply added to arrive at a correlation value of narrower bandwidth than that of any slice taken alone. The stored two-tuples can be taken in sequence, each rotated by some predetermined angle relative to its predecessor in sequence, and the rotated two-tuples summed to arrive at a correlation value with respect to a frequency that is offset from the reference frequency to an extent that relates to the predetermined angle. In this way, the receiver is able to proceed despite the transmitted frequency not being known exactly in advance and does not require prodigious storage or computational resources.

21 Claims, 5 Drawing Sheets

(51) Int. Cl.
*G06F 17/30* (2006.01)
*H04L 27/36* (2006.01)

(58) Field of Classification Search
USPC .......................................... 375/316, 343, 273
See application file for complete search history.

(56) References Cited

U.S. PATENT DOCUMENTS

| | | | |
|---|---|---|---|
| 3,679,480 A | 7/1972 | Brown et al. |
| 3,682,160 A | 8/1972 | Murata |
| 3,719,183 A | 3/1973 | Schwartz |
| 3,828,766 A | 8/1974 | Krasnow |
| 3,837,339 A | 9/1974 | Aisenberg et al. |
| 3,989,050 A | 11/1976 | Buchalter |
| 4,067,014 A | 1/1978 | Wheeler et al. |
| 4,077,397 A | 3/1978 | Ellis |
| 4,077,398 A | 3/1978 | Ellis |
| 4,082,087 A | 4/1978 | Howson |
| 4,090,752 A | 5/1978 | Long |
| 4,106,348 A | 8/1978 | Auphan |
| 4,121,573 A | 10/1978 | Crovella et al. |
| 4,129,125 A | 12/1978 | Lester |
| 4,166,453 A | 9/1979 | McClelland |
| 4,185,172 A | 1/1980 | Melindo et al. |
| 4,239,046 A | 12/1980 | Ong |
| 4,269,189 A | 5/1981 | Abraham |
| 4,331,654 A | 5/1982 | Morris |
| 4,333,150 A | 6/1982 | Matty et al. |
| 4,345,588 A | 8/1982 | Widder et al. |
| 4,418,697 A | 12/1983 | Tama |
| 4,425,117 A | 1/1984 | Hugemann |
| 4,494,950 A | 1/1985 | Fischell |
| 4,513,385 A | 4/1985 | Muri |
| 4,559,950 A | 12/1985 | Vaughan |
| 4,578,061 A | 3/1986 | Lemelson |
| 4,635,641 A | 1/1987 | Hoffman |
| 4,654,165 A | 3/1987 | Eisenber |
| 4,669,479 A | 6/1987 | Dunseath |
| 4,725,997 A | 2/1988 | Urquhart et al. |
| 4,749,575 A | 6/1988 | Rotman et al. |
| 4,763,659 A | 8/1988 | Dunseath |
| 4,784,162 A | 11/1988 | Ricks |
| 4,793,825 A | 12/1988 | Benjamin et al. |
| 4,809,705 A | 3/1989 | Ascher |
| 4,844,076 A | 7/1989 | Lesho |
| 4,858,617 A | 8/1989 | Sanders |
| 4,896,261 A | 1/1990 | Nolan |
| 4,975,230 A | 12/1990 | Pinkhasov |
| 4,987,897 A | 1/1991 | Funke |
| 5,016,634 A | 5/1991 | Vock et al. |
| 5,079,006 A | 1/1992 | Urquhart |
| 5,113,859 A | 5/1992 | Funke |
| 5,167,626 A | 12/1992 | Casper |
| 5,176,626 A | 1/1993 | Soehendra |
| 5,232,383 A | 8/1993 | Barnick |
| 5,245,332 A | 9/1993 | Katzenstein et al. |
| 5,261,402 A | 11/1993 | DiSabito |
| 5,263,481 A | 11/1993 | Axelgaard et al. |
| 5,281,287 A | 1/1994 | Lloyd |
| 5,283,136 A | 2/1994 | Peled et al. |
| 5,318,557 A | 6/1994 | Gross |
| 5,394,882 A | 3/1995 | Mawhinney |
| 5,458,141 A | 10/1995 | Neil et al. |
| 5,485,841 A | 1/1996 | Watkin et al. |
| 5,511,548 A | 4/1996 | Riazzi et al. |
| 5,551,020 A | 8/1996 | Flax et al. |
| 5,596,302 A | 1/1997 | Mastrocola et al. |
| D377,983 S | 2/1997 | Sabri et al. |
| 5,634,466 A | 6/1997 | Gruner |
| 5,634,468 A | 6/1997 | Platt |
| 5,645,063 A | 7/1997 | Straka et al. |
| 5,720,771 A | 2/1998 | Snell |
| 5,724,432 A | 3/1998 | Bouvet et al. |
| 5,740,811 A | 4/1998 | Hedberg |
| 5,792,048 A | 8/1998 | Schaefer |
| 5,802,467 A | 9/1998 | Salazar |
| 5,833,716 A | 11/1998 | Bar-Or |
| 5,845,265 A | 12/1998 | Woolston |
| 5,862,803 A | 1/1999 | Besson |
| 5,862,808 A | 1/1999 | Albarello |
| 5,868,136 A | 2/1999 | Fox |
| 5,921,925 A | 7/1999 | Cartmell et al. |
| 5,925,030 A | 7/1999 | Gross et al. |
| 5,925,066 A | 7/1999 | Kroll et al. |
| 5,957,854 A | 9/1999 | Besson et al. |
| 5,974,124 A | 10/1999 | Schlueter, Jr. et al. |
| 5,981,166 A | 11/1999 | Mandecki |
| 5,999,846 A | 12/1999 | Pardey et al. |
| 6,023,631 A | 2/2000 | Cartmell et al. |
| 6,038,464 A | 3/2000 | Axelgaard et al. |
| 6,042,710 A | 3/2000 | Dubrow |
| 6,047,203 A | 4/2000 | Sackner |
| 6,076,016 A | 6/2000 | Feierbach |
| 6,081,734 A | 6/2000 | Batz |
| 6,095,985 A | 8/2000 | Raymond et al. |
| 6,115,636 A | 9/2000 | Ryan |
| 6,117,077 A | 9/2000 | Del Mar et al. |
| 6,122,351 A | 9/2000 | Schlueter, Jr. et al. |
| 6,141,592 A | 10/2000 | Pauly |
| 6,200,265 B1 | 3/2001 | Walsh et al. |
| 6,200,625 B1 | 3/2001 | Beckett |
| 6,204,764 B1 | 3/2001 | Maloney |
| 6,206,702 B1 | 3/2001 | Hayden et al. |
| 6,217,744 B1 | 4/2001 | Crosby |
| 6,231,593 B1 | 5/2001 | Meserol |
| 6,238,338 B1 | 5/2001 | DeLuca et al. |
| 6,245,057 B1 | 6/2001 | Sieben et al. |
| 6,275,476 B1 | 8/2001 | Wood |
| 6,285,897 B1 | 9/2001 | Kilcoyne et al. |
| 6,287,252 B1 | 9/2001 | Lugo |
| 6,289,238 B1 | 9/2001 | Besson et al. |
| 6,301,298 B1 * | 10/2001 | Kuntz ............... H04L 25/03038 348/E5.084 |
| 6,315,719 B1 | 11/2001 | Rode et al. |
| 6,317,714 B1 | 11/2001 | Del Castillo |
| 6,358,202 B1 | 3/2002 | Arent |
| 6,364,834 B1 | 4/2002 | Reuss |
| 6,366,206 B1 | 4/2002 | Ishikawa et al. |
| 6,371,927 B1 | 4/2002 | Brune |
| 6,374,670 B1 | 4/2002 | Spelman |
| 6,380,858 B1 | 4/2002 | Yarin et al. |
| 6,394,953 B1 | 5/2002 | Devlin et al. |
| 6,394,997 B1 | 5/2002 | Lemelson |
| 6,409,674 B1 | 6/2002 | Brockway et al. |
| 6,426,863 B1 | 7/2002 | Munshi |
| 6,432,292 B1 | 8/2002 | Pinto et al. |
| 6,440,069 B1 | 8/2002 | Raymond et al. |
| 6,441,747 B1 | 8/2002 | Khair |
| 6,477,424 B1 | 11/2002 | Thompson et al. |
| 6,482,156 B2 | 11/2002 | Lliff |
| 6,494,829 B1 | 12/2002 | New et al. |
| 6,496,705 B1 | 12/2002 | Ng et al. |
| 6,526,315 B1 | 2/2003 | Inagawa |
| 6,544,174 B2 | 4/2003 | West |

(56) References Cited

U.S. PATENT DOCUMENTS

| | | |
|---|---|---|
| 6,564,079 B1 | 5/2003 | Cory |
| 6,577,893 B1 | 6/2003 | Besson et al. |
| 6,579,231 B1 | 6/2003 | Phipps |
| 6,605,038 B1 | 8/2003 | Teller et al. |
| 6,605,046 B1 | 8/2003 | Del Mar |
| 6,609,018 B2 | 8/2003 | Cory |
| 6,612,984 B1 | 9/2003 | Kerr |
| 6,632,175 B1 | 10/2003 | Marshall |
| 6,632,216 B2 | 10/2003 | Houzego et al. |
| 6,643,541 B2 | 11/2003 | Mok et al. |
| 6,654,638 B1 | 11/2003 | Sweeney |
| 6,663,846 B1 | 12/2003 | McCombs |
| 6,673,474 B2 | 1/2004 | Yamamoto |
| 6,680,923 B1 | 1/2004 | Leon |
| 6,689,117 B2 | 2/2004 | Sweeney et al. |
| 6,694,161 B2 | 2/2004 | Mehrotra |
| 6,704,602 B2 | 3/2004 | Berg et al. |
| 6,720,923 B1 | 4/2004 | Hayward et al. |
| 6,738,671 B2 | 5/2004 | Christophersom et al. |
| 6,740,033 B1 | 5/2004 | Olejniczak et al. |
| 6,745,082 B2 | 6/2004 | Axelgaard et al. |
| 6,755,783 B2 | 6/2004 | Cosentino |
| 6,757,523 B2 | 6/2004 | Fry |
| 6,800,060 B2 | 10/2004 | Marshall |
| 6,801,137 B2 | 10/2004 | Eggers et al. |
| 6,814,706 B2 | 11/2004 | Barton et al. |
| 6,822,554 B2 | 11/2004 | Vrijens et al. |
| 6,836,862 B1 | 12/2004 | Erekson et al. |
| 6,839,659 B2 | 1/2005 | Tarassenko et al. |
| 6,840,904 B2 | 1/2005 | Goldberg |
| 6,842,636 B2 | 1/2005 | Perrault |
| 6,845,272 B1 | 1/2005 | Thomsen |
| 6,856,832 B1 | 2/2005 | Matsumura et al. |
| 6,864,780 B2 | 3/2005 | Doi |
| 6,879,810 B2 | 4/2005 | Bouet |
| 6,882,881 B1 | 4/2005 | Lesser et al. |
| 6,897,788 B2 | 5/2005 | Khair et al. |
| 6,909,878 B2 | 6/2005 | Haller |
| 6,922,592 B2 | 7/2005 | Thompson et al. |
| 6,928,370 B2 | 8/2005 | Anuzis et al. |
| 6,929,636 B1 | 8/2005 | Von Alten |
| 6,937,150 B2 | 8/2005 | Medema |
| 6,942,616 B2 | 9/2005 | Kerr |
| 6,951,536 B2 | 10/2005 | Yokoi |
| 6,956,917 B2 * | 10/2005 | Lenosky ............ H04B 10/2543 375/232 |
| 6,957,107 B2 | 10/2005 | Rogers et al. |
| 6,959,929 B2 | 11/2005 | Pugnet et al. |
| 6,961,601 B2 | 11/2005 | Matthews et al. |
| 6,968,153 B1 | 11/2005 | Heinonen |
| 6,987,965 B2 | 1/2006 | Ng et al. |
| 6,990,082 B1 | 1/2006 | Zehavi et al. |
| 7,002,476 B2 | 2/2006 | Rapchak |
| 7,004,395 B2 | 2/2006 | Koenck |
| 7,009,634 B2 | 3/2006 | Iddan et al. |
| 7,009,946 B1 | 3/2006 | Kardach |
| 7,013,162 B2 | 3/2006 | Gorsuch |
| 7,016,648 B2 | 3/2006 | Haller |
| 7,020,508 B2 | 3/2006 | Stivoric |
| 7,024,248 B2 | 4/2006 | Penner et al. |
| 7,031,745 B2 | 4/2006 | Shen |
| 7,031,857 B2 | 4/2006 | Tarassenko et al. |
| 7,039,453 B2 | 5/2006 | Mullick |
| 7,046,649 B2 | 5/2006 | Awater et al. |
| 7,076,437 B1 | 7/2006 | Levy |
| 7,116,252 B2 | 10/2006 | Teraguchi |
| 7,118,531 B2 | 10/2006 | Krill |
| 7,127,300 B2 | 10/2006 | Mazar et al. |
| 7,139,332 B2 | 11/2006 | Yu et al. |
| 7,146,228 B2 | 12/2006 | Nielsen |
| 7,146,449 B2 | 12/2006 | Do et al. |
| 7,149,581 B2 | 12/2006 | Goedeke et al. |
| 7,154,071 B2 | 12/2006 | Sattler et al. |
| 7,154,916 B2 | 12/2006 | Soloff |
| 7,155,232 B2 | 12/2006 | Godfrey et al. |
| 7,160,258 B2 | 1/2007 | Imran |
| 7,161,484 B2 | 1/2007 | Tsoukalis |
| 7,164,942 B2 | 1/2007 | Avrahami |
| 7,171,166 B2 | 1/2007 | Ng et al. |
| 7,171,177 B2 | 1/2007 | Park et al. |
| 7,171,259 B2 | 1/2007 | Rytky |
| 7,187,960 B2 | 3/2007 | Abreu |
| 7,188,199 B2 | 3/2007 | Leung et al. |
| 7,188,767 B2 | 3/2007 | Penuela |
| 7,194,038 B1 | 3/2007 | Inkinen |
| 7,206,630 B1 | 4/2007 | Tarler |
| 7,209,790 B2 | 4/2007 | Thompson et al. |
| 7,215,660 B2 | 5/2007 | Perlman |
| 7,215,991 B2 | 5/2007 | Besson |
| 7,218,967 B2 | 5/2007 | Bergelson |
| 7,231,451 B2 | 6/2007 | Law |
| 7,243,118 B2 | 7/2007 | Lou |
| 7,246,521 B2 | 7/2007 | Kim |
| 7,249,212 B2 | 7/2007 | Do |
| 7,252,792 B2 | 8/2007 | Perrault |
| 7,253,716 B2 | 8/2007 | Lovoi et al. |
| 7,261,690 B2 | 8/2007 | Teller |
| 7,270,633 B1 | 9/2007 | Goscha |
| 7,273,454 B2 | 9/2007 | Raymond et al. |
| 7,285,090 B2 | 10/2007 | Stivoric et al. |
| 7,289,855 B2 | 10/2007 | Nghiem |
| 7,291,497 B2 | 11/2007 | Holmes |
| 7,292,139 B2 | 11/2007 | Mazar et al. |
| 7,294,105 B1 | 11/2007 | Islam |
| 7,313,163 B2 | 12/2007 | Liu |
| 7,317,378 B2 | 1/2008 | Jarvis et al. |
| 7,318,808 B2 | 1/2008 | Tarassenko et al. |
| 7,336,929 B2 | 2/2008 | Yasuda |
| 7,342,895 B2 | 3/2008 | Serpa |
| 7,346,380 B2 | 3/2008 | Axelgaard et al. |
| 7,349,722 B2 | 3/2008 | Witkowski et al. |
| 7,352,998 B2 | 4/2008 | Palin |
| 7,353,258 B2 | 4/2008 | Washburn |
| 7,357,891 B2 | 4/2008 | Yang et al. |
| 7,359,674 B2 | 4/2008 | Markki |
| 7,366,558 B2 | 4/2008 | Virtanen et al. |
| 7,373,196 B2 | 5/2008 | Ryu et al. |
| 7,375,739 B2 | 5/2008 | Robbins |
| 7,376,435 B2 | 5/2008 | McGowan |
| 7,382,263 B2 | 6/2008 | Danowski et al. |
| 7,387,607 B2 | 6/2008 | Holt |
| 7,388,903 B2 | 6/2008 | Godfrey et al. |
| 7,389,088 B2 | 6/2008 | Kim |
| 7,392,015 B1 | 6/2008 | Farlow |
| 7,395,105 B2 | 7/2008 | Schmidt et al. |
| 7,395,106 B2 | 7/2008 | Ryu et al. |
| 7,396,330 B2 | 7/2008 | Banet |
| 7,404,968 B2 | 7/2008 | Abrams et al. |
| 7,413,544 B2 | 8/2008 | Kerr |
| 7,414,534 B1 | 8/2008 | Kroll et al. |
| 7,415,242 B1 | 8/2008 | Ngan |
| 7,424,268 B2 | 9/2008 | Diener |
| 7,424,319 B2 | 9/2008 | Muehlsteff |
| 7,427,266 B2 | 9/2008 | Ayer et al. |
| 7,471,665 B2 | 12/2008 | Perlman |
| 7,499,674 B2 | 3/2009 | Salokannel |
| 7,502,643 B2 | 3/2009 | Farringdon et al. |
| 7,505,795 B1 | 3/2009 | Lim et al. |
| 7,510,121 B2 | 3/2009 | Koenck |
| 7,512,448 B2 | 3/2009 | Malick |
| 7,515,043 B2 | 4/2009 | Welch |
| 7,523,756 B2 | 4/2009 | Minai |
| 7,525,426 B2 | 4/2009 | Edelstein |
| 7,539,533 B2 | 5/2009 | Tran |
| 7,542,878 B2 | 6/2009 | Nanikashvili |
| 7,551,590 B2 | 6/2009 | Haller |
| 7,554,452 B2 | 6/2009 | Cole |
| 7,575,005 B2 | 8/2009 | Mumford |
| 7,599,003 B2 | 10/2009 | Suzuki et al. |
| 7,616,111 B2 | 11/2009 | Covannon |
| 7,616,710 B2 | 11/2009 | Kim et al. |
| 7,617,001 B2 | 11/2009 | Penner et al. |
| 7,626,387 B2 | 12/2009 | Adachi |
| 7,640,802 B2 | 1/2010 | King et al. |

(56) References Cited

U.S. PATENT DOCUMENTS

| | | |
|---|---|---|
| 7,647,112 B2 | 1/2010 | Tracey |
| 7,647,185 B2 | 1/2010 | Tarassenko et al. |
| 7,653,031 B2 | 1/2010 | Godfrey et al. |
| 7,668,437 B1 | 2/2010 | Yamada et al. |
| 7,672,703 B2 | 3/2010 | Yeo et al. |
| 7,672,714 B2 | 3/2010 | Kuo |
| 7,673,679 B2 | 3/2010 | Harrison et al. |
| 7,678,043 B2 | 3/2010 | Gilad |
| 7,688,204 B2 | 3/2010 | Yamanaka et al. |
| 7,689,437 B1 | 3/2010 | Teller et al. |
| 7,697,994 B2 | 4/2010 | VanDanacker et al. |
| 7,720,036 B2 | 5/2010 | Sadri |
| 7,729,776 B2 | 6/2010 | Von Arx et al. |
| 7,733,224 B2 | 6/2010 | Tran |
| 7,736,318 B2 | 6/2010 | Cosentino |
| 7,756,587 B2 | 7/2010 | Penner et al. |
| 7,782,991 B2 | 8/2010 | Sobchak et al. |
| 7,797,033 B2 | 9/2010 | D'Andrea et al. |
| 7,809,399 B2 | 10/2010 | Lu |
| 7,844,341 B2 | 11/2010 | Von Arx et al. |
| 7,904,133 B2 | 3/2011 | Gehman et al. |
| D639,437 S | 6/2011 | Bishay et al. |
| 7,978,064 B2 | 7/2011 | Zdeblick et al. |
| 7,983,189 B2 | 7/2011 | Bugenhagen |
| 8,036,748 B2 | 10/2011 | Zdeblick et al. |
| 8,055,334 B2 | 11/2011 | Savage et al. |
| 8,073,707 B2 | 12/2011 | Teller et al. |
| 8,083,128 B2 | 12/2011 | Dembo et al. |
| 8,114,021 B2 | 2/2012 | Robertson et al. |
| 8,123,576 B2 | 2/2012 | Kim |
| 8,140,143 B2 | 3/2012 | Picard et al. |
| 8,170,515 B2 | 5/2012 | Le Reverend et al. |
| 8,180,425 B2 | 5/2012 | Selvitelli et al. |
| 8,184,854 B2 | 5/2012 | Bartsch |
| 8,193,821 B2 | 6/2012 | Mueller |
| 8,200,320 B2 | 6/2012 | Kovacs |
| 8,214,007 B2 | 7/2012 | Baker et al. |
| 8,238,998 B2 | 8/2012 | Park |
| 8,249,686 B2 | 8/2012 | Libbus et al. |
| 8,285,356 B2 | 10/2012 | Bly et al. |
| 8,290,574 B2 | 10/2012 | Feild et al. |
| 8,301,232 B2 | 10/2012 | Albert et al. |
| 8,308,640 B2 | 11/2012 | Baldus et al. |
| 8,315,687 B2 | 11/2012 | Cross et al. |
| 8,332,009 B2 | 12/2012 | McLaughlin et al. |
| 8,360,976 B2 | 1/2013 | Imran |
| 8,369,936 B2 | 2/2013 | Farringdon et al. |
| 8,386,009 B2 | 2/2013 | Lindberg et al. |
| 8,404,275 B2 | 3/2013 | Habboushe |
| 8,440,274 B2 | 5/2013 | Wang |
| 8,471,960 B2 | 6/2013 | Lin et al. |
| 8,514,979 B2 | 8/2013 | Laporte |
| 8,604,974 B2 | 12/2013 | Ganeshan |
| 8,615,290 B2 | 12/2013 | Lin et al. |
| 8,620,402 B2 | 12/2013 | Parker, III et al. |
| 8,754,799 B2 | 6/2014 | Coln et al. |
| 8,773,258 B2 | 7/2014 | Vosch et al. |
| 8,836,513 B2 | 9/2014 | Hafezi et al. |
| 8,858,432 B2 | 10/2014 | Robertson et al. |
| 8,932,221 B2 | 1/2015 | Colliou et al. |
| 8,945,005 B2 | 2/2015 | Hafezi et al. |
| 9,014,779 B2 | 4/2015 | Zdeblick et al. |
| 9,149,577 B2 | 10/2015 | Robertson et al. |
| 9,158,890 B2 | 10/2015 | Meredith et al. |
| 9,230,141 B2 * | 1/2016 | Kawaguchi ........ G06K 19/0723 |
| 9,270,503 B2 | 2/2016 | Fleming et al. |
| 2001/0027331 A1 | 10/2001 | Thompson |
| 2001/0031071 A1 | 10/2001 | Nichols et al. |
| 2001/0044588 A1 | 11/2001 | Mault |
| 2001/0051766 A1 | 12/2001 | Gazdzinski |
| 2001/0056262 A1 | 12/2001 | Cabiri et al. |
| 2002/0002326 A1 | 1/2002 | Causey et al. |
| 2002/0026111 A1 | 2/2002 | Ackerman |
| 2002/0040278 A1 | 4/2002 | Anuzis et al. |
| 2002/0077620 A1 | 6/2002 | Sweeney et al. |
| 2002/0132226 A1 | 9/2002 | Nair |
| 2002/0169696 A1 | 11/2002 | Zara |
| 2002/0192159 A1 | 12/2002 | Reitberg |
| 2002/0193669 A1 | 12/2002 | Glukhovsky |
| 2002/0198470 A1 | 12/2002 | Imran et al. |
| 2003/0017826 A1 | 1/2003 | Fishman |
| 2003/0023150 A1 | 1/2003 | Yokoi et al. |
| 2003/0028226 A1 | 2/2003 | Thompson |
| 2003/0065536 A1 | 4/2003 | Hansen |
| 2003/0076179 A1 | 4/2003 | Branch et al. |
| 2003/0083559 A1 | 5/2003 | Thompson |
| 2003/0091121 A1* | 5/2003 | Kenmochi ................ H04L 7/06 |
| | | 375/272 |
| 2003/0126593 A1 | 7/2003 | Mault |
| 2003/0130714 A1 | 7/2003 | Nielsen et al. |
| 2003/0135128 A1 | 7/2003 | Suffin et al. |
| 2003/0135392 A1 | 7/2003 | Vrijens et al. |
| 2003/0152622 A1 | 8/2003 | Louie-Helm et al. |
| 2003/0158466 A1 | 8/2003 | Lynn et al. |
| 2003/0158756 A1 | 8/2003 | Abramson |
| 2003/0162556 A1 | 8/2003 | Libes |
| 2003/0164401 A1 | 9/2003 | Andreasson et al. |
| 2003/0167000 A1 | 9/2003 | Mullick et al. |
| 2003/0171791 A1 | 9/2003 | KenKnight |
| 2003/0171898 A1 | 9/2003 | Tarassenko et al. |
| 2003/0181788 A1 | 9/2003 | Yokoi et al. |
| 2003/0181815 A1 | 9/2003 | Ebner et al. |
| 2003/0185286 A1 | 10/2003 | Yuen |
| 2003/0187337 A1 | 10/2003 | Tarassenko et al. |
| 2003/0187338 A1 | 10/2003 | Say et al. |
| 2003/0195403 A1 | 10/2003 | Berner et al. |
| 2003/0213495 A1 | 11/2003 | Fujita et al. |
| 2003/0214579 A1 | 11/2003 | Iddan |
| 2003/0216622 A1 | 11/2003 | Meron et al. |
| 2003/0216625 A1 | 11/2003 | Phipps |
| 2003/0216666 A1 | 11/2003 | Ericson et al. |
| 2003/0216729 A1 | 11/2003 | Marchitto |
| 2003/0229382 A1 | 12/2003 | Sun et al. |
| 2004/0008123 A1 | 1/2004 | Carrender et al. |
| 2004/0018476 A1 | 1/2004 | LaDue |
| 2004/0019172 A1 | 1/2004 | Yang et al. |
| 2004/0034295 A1 | 2/2004 | Salganicoff |
| 2004/0049245 A1 | 3/2004 | Gass |
| 2004/0073095 A1 | 4/2004 | Causey et al. |
| 2004/0073454 A1 | 4/2004 | Urquhart et al. |
| 2004/0077995 A1 | 4/2004 | Ferek-Petric |
| 2004/0082982 A1 | 4/2004 | Gord et al. |
| 2004/0087839 A1 | 5/2004 | Raymond et al. |
| 2004/0092801 A1 | 5/2004 | Drakulic |
| 2004/0106859 A1 | 6/2004 | Say et al. |
| 2004/0115507 A1 | 6/2004 | Potter et al. |
| 2004/0115517 A1 | 6/2004 | Fukuda et al. |
| 2004/0121015 A1 | 6/2004 | Chidlaw et al. |
| 2004/0122297 A1 | 6/2004 | Stahmann et al. |
| 2004/0148140 A1 | 7/2004 | Tarassenko et al. |
| 2004/0153007 A1 | 8/2004 | Harris |
| 2004/0167226 A1 | 8/2004 | Serafini |
| 2004/0167801 A1 | 8/2004 | Say et al. |
| 2004/0193020 A1 | 9/2004 | Chiba |
| 2004/0193029 A1 | 9/2004 | Glukhovsky |
| 2004/0193446 A1 | 9/2004 | Mayer et al. |
| 2004/0199222 A1 | 10/2004 | Sun et al. |
| 2004/0215084 A1 | 10/2004 | Shimizu et al. |
| 2004/0218683 A1 | 11/2004 | Batra |
| 2004/0220643 A1 | 11/2004 | Schmidt |
| 2004/0224644 A1 | 11/2004 | Wu |
| 2004/0225199 A1 | 11/2004 | Evanyk |
| 2004/0253304 A1 | 12/2004 | Gross et al. |
| 2004/0260154 A1 | 12/2004 | Sidelnik |
| 2005/0017841 A1 | 1/2005 | Doi |
| 2005/0020887 A1 | 1/2005 | Goldberg |
| 2005/0021103 A1 | 1/2005 | DiLorenzo |
| 2005/0021370 A1 | 1/2005 | Riff |
| 2005/0024198 A1 | 2/2005 | Ward |
| 2005/0027205 A1 | 2/2005 | Tarassenko et al. |
| 2005/0038321 A1 | 2/2005 | Fujita et al. |
| 2005/0043634 A1 | 2/2005 | Yokoi et al. |
| 2005/0055014 A1 | 3/2005 | Coppeta et al. |
| 2005/0062644 A1 | 3/2005 | Leci |

(56) References Cited

U.S. PATENT DOCUMENTS

| | | |
|---|---|---|
| 2005/0065407 A1 | 3/2005 | Nakamura et al. |
| 2005/0070778 A1 | 3/2005 | Lackey |
| 2005/0092108 A1 | 5/2005 | Andermo |
| 2005/0096514 A1 | 5/2005 | Starkebaum |
| 2005/0096562 A1 | 5/2005 | Delalic et al. |
| 2005/0101843 A1 | 5/2005 | Quinn |
| 2005/0101872 A1 | 5/2005 | Sattler |
| 2005/0115561 A1 | 6/2005 | Stahmann et al. |
| 2005/0116820 A1 | 6/2005 | Goldreich |
| 2005/0117389 A1 | 6/2005 | Worledge |
| 2005/0121322 A1 | 6/2005 | Say et al. |
| 2005/0131281 A1 | 6/2005 | Ayer et al. |
| 2005/0137480 A1 | 6/2005 | Alt et al. |
| 2005/0143623 A1 | 6/2005 | Kojima |
| 2005/0148883 A1 | 7/2005 | Boesen |
| 2005/0154428 A1 | 7/2005 | Bruinsma |
| 2005/0165323 A1 | 7/2005 | Montgomery |
| 2005/0177069 A1 | 8/2005 | Takizawa |
| 2005/0182389 A1 | 8/2005 | LaPorte |
| 2005/0187789 A1 | 8/2005 | Hatlestad et al. |
| 2005/0192489 A1 | 9/2005 | Marshall |
| 2005/0197680 A1 | 9/2005 | DelMain et al. |
| 2005/0228268 A1 | 10/2005 | Cole |
| 2005/0234307 A1 | 10/2005 | Heinonen |
| 2005/0240305 A1 | 10/2005 | Bogash et al. |
| 2005/0245794 A1 | 11/2005 | Dinsmoor |
| 2005/0259768 A1 | 11/2005 | Yang et al. |
| 2005/0261559 A1 | 11/2005 | Mumford |
| 2005/0267556 A1 | 12/2005 | Shuros et al. |
| 2005/0267756 A1 | 12/2005 | Schultz et al. |
| 2005/0277912 A1 | 12/2005 | John |
| 2005/0277999 A1 | 12/2005 | Strother et al. |
| 2005/0285746 A1 | 12/2005 | Sengupta |
| 2005/0288594 A1 | 12/2005 | Lewkowicz et al. |
| 2006/0001496 A1 | 1/2006 | Abrosimov et al. |
| 2006/0036134 A1 | 2/2006 | Tarassenko et al. |
| 2006/0061472 A1 | 3/2006 | Lovoi et al. |
| 2006/0065713 A1 | 3/2006 | Kingery |
| 2006/0074283 A1 | 4/2006 | Henderson |
| 2006/0078765 A1 | 4/2006 | Yang et al. |
| 2006/0095091 A1 | 5/2006 | Drew |
| 2006/0095093 A1 | 5/2006 | Bettesh et al. |
| 2006/0100533 A1 | 5/2006 | Han |
| 2006/0109058 A1 | 5/2006 | Keating |
| 2006/0110962 A1 | 5/2006 | Powell |
| 2006/0122474 A1 | 6/2006 | Teller et al. |
| 2006/0122667 A1 | 6/2006 | Chavan et al. |
| 2006/0136266 A1 | 6/2006 | Tarassenko et al. |
| 2006/0136744 A1 | 6/2006 | Lange |
| 2006/0142648 A1 | 6/2006 | Banet |
| 2006/0145876 A1 | 7/2006 | Kimura |
| 2006/0148254 A1 | 7/2006 | McLean |
| 2006/0149339 A1 | 7/2006 | Burnes |
| 2006/0155174 A1 | 7/2006 | Glukhovsky et al. |
| 2006/0155183 A1 | 7/2006 | Kroecker |
| 2006/0158820 A1 | 7/2006 | Takiguchi |
| 2006/0161225 A1 | 7/2006 | Sormann et al. |
| 2006/0179949 A1 | 8/2006 | Kim |
| 2006/0183993 A1 | 8/2006 | Horn |
| 2006/0184092 A1 | 8/2006 | Atanasoska et al. |
| 2006/0204738 A1 | 9/2006 | Dubrow et al. |
| 2006/0210626 A1 | 9/2006 | Spaeder |
| 2006/0216603 A1 | 9/2006 | Choi |
| 2006/0218011 A1 | 9/2006 | Walker |
| 2006/0235489 A1 | 10/2006 | Drew |
| 2006/0243288 A1 | 11/2006 | Kim et al. |
| 2006/0247505 A1 | 11/2006 | Siddiqui |
| 2006/0253005 A1 | 11/2006 | Drinan |
| 2006/0255064 A1 | 11/2006 | Donaldson |
| 2006/0265246 A1 | 11/2006 | Hoag |
| 2006/0270346 A1 | 11/2006 | Ibrahim |
| 2006/0277097 A1 | 12/2006 | Shafron et al. |
| 2006/0280227 A1 | 12/2006 | Pinkney |
| 2006/0282001 A1 | 12/2006 | Noel |
| 2006/0289640 A1 | 12/2006 | Mercure |
| 2006/0293607 A1 | 12/2006 | Alt |
| 2007/0002038 A1 | 1/2007 | Suzuki |
| 2007/0006636 A1 | 1/2007 | King et al. |
| 2007/0008113 A1 | 1/2007 | Spoonhower et al. |
| 2007/0016089 A1 | 1/2007 | Fischell et al. |
| 2007/0027386 A1 | 2/2007 | Such |
| 2007/0027388 A1 | 2/2007 | Chou |
| 2007/0038054 A1 | 2/2007 | Zhou |
| 2007/0049339 A1 | 3/2007 | Barak et al. |
| 2007/0055098 A1 | 3/2007 | Shimizu et al. |
| 2007/0060797 A1 | 3/2007 | Ball |
| 2007/0073353 A1 | 3/2007 | Rooney et al. |
| 2007/0096765 A1 | 5/2007 | Kagan |
| 2007/0106346 A1 | 5/2007 | Bergelson |
| 2007/0123772 A1 | 5/2007 | Euliano |
| 2007/0129622 A1 | 6/2007 | Bourget |
| 2007/0130287 A1 | 6/2007 | Kumar |
| 2007/0135803 A1 | 6/2007 | Belson |
| 2007/0142721 A1 | 6/2007 | Berner et al. |
| 2007/0156016 A1 | 7/2007 | Betesh |
| 2007/0162089 A1 | 7/2007 | Mosesov |
| 2007/0162090 A1 | 7/2007 | Penner |
| 2007/0167495 A1 | 7/2007 | Brown et al. |
| 2007/0167848 A1 | 7/2007 | Kuo et al. |
| 2007/0173701 A1 | 7/2007 | Al-Ali |
| 2007/0179347 A1 | 8/2007 | Tarassenko et al. |
| 2007/0180047 A1 | 8/2007 | Dong et al. |
| 2007/0185393 A1 | 8/2007 | Zhou |
| 2007/0191002 A1 | 8/2007 | Ge |
| 2007/0196456 A1 | 8/2007 | Stevens |
| 2007/0207793 A1 | 9/2007 | Myer |
| 2007/0213659 A1 | 9/2007 | Trovato et al. |
| 2007/0237719 A1 | 10/2007 | Jones |
| 2007/0244370 A1 | 10/2007 | Kuo et al. |
| 2007/0249946 A1 | 10/2007 | Kumar et al. |
| 2007/0255198 A1 | 11/2007 | Leong et al. |
| 2007/0255330 A1 | 11/2007 | Lee |
| 2007/0270672 A1 | 11/2007 | Hayter |
| 2007/0279217 A1 | 12/2007 | Venkatraman |
| 2007/0282174 A1 | 12/2007 | Sabatino |
| 2007/0282177 A1 | 12/2007 | Pilz |
| 2007/0291715 A1 | 12/2007 | Laroia et al. |
| 2007/0299480 A1 | 12/2007 | Hill |
| 2008/0014866 A1 | 1/2008 | Lipowski et al. |
| 2008/0015421 A1 | 1/2008 | Penner |
| 2008/0015494 A1 | 1/2008 | Santini et al. |
| 2008/0020037 A1 | 1/2008 | Robertson et al. |
| 2008/0021519 A1 | 1/2008 | DeGeest |
| 2008/0021521 A1 | 1/2008 | Shah |
| 2008/0027679 A1 | 1/2008 | Shklarski |
| 2008/0033273 A1 | 2/2008 | Zhou |
| 2008/0045843 A1 | 2/2008 | Tsuji et al. |
| 2008/0046038 A1 | 2/2008 | Hill |
| 2008/0051667 A1 | 2/2008 | Goldreich |
| 2008/0051767 A1 | 2/2008 | Rossing et al. |
| 2008/0058614 A1 | 3/2008 | Banet |
| 2008/0062856 A1 | 3/2008 | Feher |
| 2008/0065168 A1 | 3/2008 | Bitton et al. |
| 2008/0074307 A1 | 3/2008 | Boric-Lubecke |
| 2008/0077015 A1 | 3/2008 | Boric-Lubecke |
| 2008/0077028 A1 | 3/2008 | Schaldach et al. |
| 2008/0077188 A1 | 3/2008 | Denker et al. |
| 2008/0091089 A1 | 4/2008 | Guillory et al. |
| 2008/0091114 A1 | 4/2008 | Min |
| 2008/0097549 A1 | 4/2008 | Colbaugh |
| 2008/0097917 A1 | 4/2008 | Dicks |
| 2008/0099366 A1 | 5/2008 | Niemiec et al. |
| 2008/0103440 A1 | 5/2008 | Ferren et al. |
| 2008/0112885 A1 | 5/2008 | Okunev et al. |
| 2008/0114224 A1 | 5/2008 | Bandy et al. |
| 2008/0119705 A1 | 5/2008 | Patel |
| 2008/0119716 A1 | 5/2008 | Boric-Lubecke |
| 2008/0137566 A1 | 6/2008 | Marholev |
| 2008/0139907 A1 | 6/2008 | Rao et al. |
| 2008/0140403 A1 | 6/2008 | Hughes et al. |
| 2008/0146871 A1 | 6/2008 | Arneson et al. |
| 2008/0146889 A1 | 6/2008 | Young |
| 2008/0146892 A1 | 6/2008 | LeBoeuf |
| 2008/0154104 A1 | 6/2008 | Lamego |

(56) References Cited

U.S. PATENT DOCUMENTS

| | | |
|---|---|---|
| 2008/0166992 A1 | 7/2008 | Ricordi |
| 2008/0183245 A1 | 7/2008 | Van Oort |
| 2008/0188837 A1 | 8/2008 | Belsky et al. |
| 2008/0194912 A1 | 8/2008 | Trovato et al. |
| 2008/0208009 A1 | 8/2008 | Shklarski |
| 2008/0214901 A1 | 9/2008 | Gehman |
| 2008/0214985 A1 | 9/2008 | Yanaki |
| 2008/0243020 A1 | 10/2008 | Chou |
| 2008/0249360 A1 | 10/2008 | Li |
| 2008/0262320 A1 | 10/2008 | Schaefer et al. |
| 2008/0262336 A1 | 10/2008 | Ryu |
| 2008/0269664 A1 | 10/2008 | Trovato et al. |
| 2008/0275312 A1 | 11/2008 | Mosesov |
| 2008/0284599 A1 | 11/2008 | Zdeblick et al. |
| 2008/0288026 A1 | 11/2008 | Cross et al. |
| 2008/0288027 A1 | 11/2008 | Kroll |
| 2008/0294020 A1 | 11/2008 | Sapounas |
| 2008/0300572 A1 | 12/2008 | Rankers |
| 2008/0303638 A1 | 12/2008 | Nguyen |
| 2008/0306357 A1 | 12/2008 | Korman |
| 2008/0306359 A1 | 12/2008 | Zdeblick et al. |
| 2008/0306360 A1 | 12/2008 | Robertson et al. |
| 2008/0306362 A1 | 12/2008 | Davis |
| 2008/0311852 A1 | 12/2008 | Hansen |
| 2008/0312522 A1 | 12/2008 | Rowlandson |
| 2008/0316020 A1 | 12/2008 | Robertson |
| 2009/0009332 A1 | 1/2009 | Nunez et al. |
| 2009/0024045 A1 | 1/2009 | Prakash |
| 2009/0030293 A1 | 1/2009 | Cooper et al. |
| 2009/0030297 A1 | 1/2009 | Miller |
| 2009/0034209 A1 | 2/2009 | Joo |
| 2009/0043171 A1 | 2/2009 | Rule |
| 2009/0048498 A1 | 2/2009 | Riskey |
| 2009/0062634 A1 | 3/2009 | Say et al. |
| 2009/0062670 A1 | 3/2009 | Sterling |
| 2009/0069642 A1 | 3/2009 | Gao |
| 2009/0069655 A1 | 3/2009 | Say et al. |
| 2009/0069656 A1 | 3/2009 | Say et al. |
| 2009/0069657 A1 | 3/2009 | Say et al. |
| 2009/0069658 A1 | 3/2009 | Say et al. |
| 2009/0069724 A1 | 3/2009 | Otto et al. |
| 2009/0076340 A1 | 3/2009 | Libbus et al. |
| 2009/0076343 A1 | 3/2009 | James |
| 2009/0076350 A1 | 3/2009 | Bly et al. |
| 2009/0076397 A1 | 3/2009 | Libbus et al. |
| 2009/0082645 A1 | 3/2009 | Hafezi et al. |
| 2009/0088618 A1 | 4/2009 | Arneson |
| 2009/0099435 A1 | 4/2009 | Say et al. |
| 2009/0110148 A1 | 4/2009 | Zhang |
| 2009/0112626 A1 | 4/2009 | Talbot |
| 2009/0124871 A1 | 5/2009 | Arshak |
| 2009/0131774 A1 | 5/2009 | Sweitzer |
| 2009/0135886 A1 | 5/2009 | Robertson et al. |
| 2009/0157113 A1 | 6/2009 | Marcotte |
| 2009/0157358 A1 | 6/2009 | Kim |
| 2009/0161602 A1 | 6/2009 | Matsumoto |
| 2009/0163789 A1 | 6/2009 | Say et al. |
| 2009/0171180 A1 | 7/2009 | Pering |
| 2009/0173628 A1 | 7/2009 | Say et al. |
| 2009/0177055 A1 | 7/2009 | Say et al. |
| 2009/0177056 A1 | 7/2009 | Say et al. |
| 2009/0177057 A1 | 7/2009 | Say et al. |
| 2009/0177058 A1 | 7/2009 | Say et al. |
| 2009/0177059 A1 | 7/2009 | Say et al. |
| 2009/0177060 A1 | 7/2009 | Say et al. |
| 2009/0177061 A1 | 7/2009 | Say et al. |
| 2009/0177062 A1 | 7/2009 | Say et al. |
| 2009/0177063 A1 | 7/2009 | Say et al. |
| 2009/0177064 A1 | 7/2009 | Say et al. |
| 2009/0177065 A1 | 7/2009 | Say et al. |
| 2009/0177066 A1 | 7/2009 | Say et al. |
| 2009/0182206 A1 | 7/2009 | Najafi |
| 2009/0182212 A1 | 7/2009 | Say et al. |
| 2009/0182213 A1 | 7/2009 | Say et al. |
| 2009/0182214 A1 | 7/2009 | Say et al. |
| 2009/0182215 A1 | 7/2009 | Say et al. |
| 2009/0182388 A1 | 7/2009 | Von Arx |
| 2009/0187088 A1 | 7/2009 | Say et al. |
| 2009/0187089 A1 | 7/2009 | Say et al. |
| 2009/0187090 A1 | 7/2009 | Say et al. |
| 2009/0187091 A1 | 7/2009 | Say et al. |
| 2009/0187092 A1 | 7/2009 | Say et al. |
| 2009/0187093 A1 | 7/2009 | Say et al. |
| 2009/0187094 A1 | 7/2009 | Say et al. |
| 2009/0187095 A1 | 7/2009 | Say et al. |
| 2009/0187381 A1 | 7/2009 | King et al. |
| 2009/0192351 A1 | 7/2009 | Nishino |
| 2009/0192368 A1 | 7/2009 | Say et al. |
| 2009/0192369 A1 | 7/2009 | Say et al. |
| 2009/0192370 A1 | 7/2009 | Say et al. |
| 2009/0192371 A1 | 7/2009 | Say et al. |
| 2009/0192372 A1 | 7/2009 | Say et al. |
| 2009/0192373 A1 | 7/2009 | Say et al. |
| 2009/0192374 A1 | 7/2009 | Say et al. |
| 2009/0192375 A1 | 7/2009 | Say et al. |
| 2009/0192376 A1 | 7/2009 | Say et al. |
| 2009/0192377 A1 | 7/2009 | Say et al. |
| 2009/0192378 A1 | 7/2009 | Say et al. |
| 2009/0192379 A1 | 7/2009 | Say et al. |
| 2009/0198115 A1 | 8/2009 | Say et al. |
| 2009/0198116 A1 | 8/2009 | Say et al. |
| 2009/0198175 A1 | 8/2009 | Say et al. |
| 2009/0203964 A1 | 8/2009 | Shimizu et al. |
| 2009/0203971 A1 | 8/2009 | Sciarappa |
| 2009/0203972 A1 | 8/2009 | Heneghan |
| 2009/0203978 A1 | 8/2009 | Say et al. |
| 2009/0204265 A1 | 8/2009 | Hackett |
| 2009/0210164 A1 | 8/2009 | Say et al. |
| 2009/0216101 A1 | 8/2009 | Say et al. |
| 2009/0216102 A1 | 8/2009 | Say et al. |
| 2009/0227204 A1 | 9/2009 | Robertson et al. |
| 2009/0227876 A1 | 9/2009 | Tran |
| 2009/0227940 A1 | 9/2009 | Say et al. |
| 2009/0227941 A1 | 9/2009 | Say et al. |
| 2009/0228214 A1 | 9/2009 | Say et al. |
| 2009/0231125 A1 | 9/2009 | Baldus |
| 2009/0234200 A1 | 9/2009 | Husheer |
| 2009/0243833 A1 | 10/2009 | Huang |
| 2009/0253960 A1 | 10/2009 | Takenaka et al. |
| 2009/0256702 A1 | 10/2009 | Robertson |
| 2009/0264714 A1 | 10/2009 | Chou |
| 2009/0264964 A1 | 10/2009 | Abrahamson |
| 2009/0265186 A1 | 10/2009 | Tarassenko et al. |
| 2009/0273467 A1 | 11/2009 | Elixmann |
| 2009/0281539 A1 | 11/2009 | Selig |
| 2009/0292194 A1 | 11/2009 | Libbus et al. |
| 2009/0295548 A1 | 12/2009 | Ronkka |
| 2009/0296677 A1 | 12/2009 | Mahany |
| 2009/0301925 A1 | 12/2009 | Alloro et al. |
| 2009/0303920 A1 | 12/2009 | Mahany |
| 2009/0312619 A1 | 12/2009 | Say et al. |
| 2009/0318761 A1 | 12/2009 | Rabinovitz |
| 2009/0318779 A1 | 12/2009 | Tran |
| 2009/0318783 A1 | 12/2009 | Rohde |
| 2009/0318793 A1 | 12/2009 | Datta |
| 2010/0010330 A1 | 1/2010 | Rankers |
| 2010/0033324 A1 | 2/2010 | Shimizu et al. |
| 2010/0049006 A1 | 2/2010 | Magar |
| 2010/0049012 A1 | 2/2010 | Dijksman et al. |
| 2010/0049069 A1 | 2/2010 | Tarassenko et al. |
| 2010/0049263 A1 | 2/2010 | Reeve |
| 2010/0056878 A1 | 3/2010 | Partin |
| 2010/0056891 A1 | 3/2010 | Say et al. |
| 2010/0056939 A1 | 3/2010 | Tarassenko et al. |
| 2010/0057041 A1 | 3/2010 | Hayter |
| 2010/0062709 A1 | 3/2010 | Kato |
| 2010/0063438 A1 | 3/2010 | Bengtsson |
| 2010/0063841 A1 | 3/2010 | D'Ambrosia et al. |
| 2010/0069002 A1 | 3/2010 | Rong |
| 2010/0069717 A1 | 3/2010 | Hafezi et al. |
| 2010/0099967 A1 | 4/2010 | Say et al. |
| 2010/0099968 A1 | 4/2010 | Say et al. |
| 2010/0099969 A1 | 4/2010 | Say et al. |
| 2010/0100077 A1 | 4/2010 | Rush |

(56) References Cited

U.S. PATENT DOCUMENTS

| | | |
|---|---|---|
| 2010/0100078 A1 | 4/2010 | Say et al. |
| 2010/0106001 A1 | 4/2010 | Say et al. |
| 2010/0118853 A1 | 5/2010 | Godfrey |
| 2010/0139672 A1 | 6/2010 | Kroll et al. |
| 2010/0160742 A1 | 6/2010 | Seidl et al. |
| 2010/0168659 A1 | 7/2010 | Say et al. |
| 2010/0179398 A1 | 7/2010 | Say et al. |
| 2010/0191073 A1 | 7/2010 | Tarassenko et al. |
| 2010/0210299 A1 | 8/2010 | Gorbachov |
| 2010/0222652 A1 | 9/2010 | Cho |
| 2010/0228113 A1 | 9/2010 | Solosko |
| 2010/0234706 A1 | 9/2010 | Gilland |
| 2010/0234715 A1 | 9/2010 | Shin |
| 2010/0234914 A1 | 9/2010 | Shen |
| 2010/0245091 A1 | 9/2010 | Singh |
| 2010/0249881 A1 | 9/2010 | Corndorf |
| 2010/0256461 A1 | 10/2010 | Mohamedali |
| 2010/0259543 A1 | 10/2010 | Tarassenko et al. |
| 2010/0268048 A1 | 10/2010 | Say et al. |
| 2010/0268049 A1 | 10/2010 | Say et al. |
| 2010/0268050 A1 | 10/2010 | Say et al. |
| 2010/0274111 A1 | 10/2010 | Say et al. |
| 2010/0280345 A1 | 11/2010 | Say et al. |
| 2010/0280346 A1 | 11/2010 | Say et al. |
| 2010/0298650 A1 | 11/2010 | Moon et al. |
| 2010/0298730 A1 | 11/2010 | Tarassenko et al. |
| 2010/0311482 A1 | 12/2010 | Lange |
| 2010/0312580 A1 | 12/2010 | Tarassenko et al. |
| 2011/0004079 A1 | 1/2011 | Al-Ali et al. |
| 2011/0065983 A1 | 3/2011 | Hafezi et al. |
| 2011/0081860 A1 | 4/2011 | Brown et al. |
| 2011/0124983 A1 | 5/2011 | Kroll et al. |
| 2011/0144470 A1 | 6/2011 | Mazar et al. |
| 2011/0166937 A1 | 7/2011 | Bangera et al. |
| 2011/0237924 A1 | 9/2011 | McGusty et al. |
| 2011/0279963 A1 | 11/2011 | Kumar et al. |
| 2012/0016231 A1 | 1/2012 | Westmoreland |
| 2012/0029307 A1 | 2/2012 | Paquet et al. |
| 2012/0029309 A1 | 2/2012 | Paquet et al. |
| 2012/0071743 A1 | 3/2012 | Todorov et al. |
| 2012/0083715 A1 | 4/2012 | Yuen et al. |
| 2012/0089000 A1 | 4/2012 | Bishay et al. |
| 2012/0101396 A1 | 4/2012 | Solosko et al. |
| 2012/0197144 A1 | 8/2012 | Christ et al. |
| 2012/0299723 A1 | 11/2012 | Hafezi et al. |
| 2012/0310070 A1 | 12/2012 | Kumar et al. |
| 2012/0316413 A1 | 12/2012 | Liu et al. |
| 2013/0030259 A1 | 1/2013 | Thomsen et al. |
| 2013/0057385 A1 | 3/2013 | Murakami et al. |
| 2013/0060115 A1 | 3/2013 | Gehman et al. |
| 2014/0300490 A1 | 10/2014 | Kotz et al. |
| 2015/0080677 A1 | 3/2015 | Thompson et al. |
| 2015/0080678 A1 | 3/2015 | Frank et al. |
| 2015/0080679 A1 | 3/2015 | Frank et al. |
| 2015/0080680 A1 | 3/2015 | Zdeblick et al. |
| 2015/0080681 A1 | 3/2015 | Hafezi et al. |
| 2015/0127737 A1 | 5/2015 | Thompson et al. |
| 2015/0127738 A1 | 5/2015 | Thompson et al. |
| 2015/0182170 A1 | 7/2015 | Zdeblick et al. |
| 2015/0248833 A1 | 9/2015 | Arne et al. |
| 2016/0204883 A1* | 7/2016 | Pullela ............... H03M 1/50 455/70 |

FOREIGN PATENT DOCUMENTS

| | | |
|---|---|---|
| CN | 101005470 | 7/2007 |
| CN | 101032396 | 9/2007 |
| CN | 201076456 | 6/2008 |
| DE | 10313005 | 10/2004 |
| EP | 1246356 | 10/2002 |
| EP | 1789128 | 5/2007 |
| EP | 2063535 | 5/2009 |
| EP | 2143369 | 1/2010 |
| JP | 61072712 | 4/1986 |
| JP | S62112529 | 5/1987 |
| JP | 05228128 | 9/1993 |
| JP | 1014898 | 1/1998 |
| JP | 2000506410 | 5/2000 |
| JP | 2002224053 | 8/2002 |
| JP | 2002282219 | 10/2002 |
| JP | 2002291684 | 10/2002 |
| JP | 2003050867 | 2/2003 |
| JP | 2004007187 | 1/2004 |
| JP | 2004313242 | 11/2004 |
| JP | 2005073886 | 3/2005 |
| JP | 2005304880 | 4/2005 |
| JP | 2005137683 | 6/2005 |
| JP | 2005532841 | 11/2005 |
| JP | 2005532849 | 11/2005 |
| JP | 2006508752 | 3/2006 |
| JP | 2006509574 | 3/2006 |
| JP | 2006136405 | 6/2006 |
| JP | 2006177699 | 7/2006 |
| JP | 2007167448 | 7/2007 |
| JP | 2007313340 | 12/2007 |
| JP | 2008011865 | 1/2008 |
| JP | 2008501415 | 1/2008 |
| JP | 2008086390 | 4/2008 |
| JP | 2008191110 | 8/2008 |
| JP | 2009528909 | 8/2009 |
| KR | 927471 | 11/2009 |
| KR | 10-2012-09995 | 9/2012 |
| TW | 553735 | 9/2003 |
| TW | 200724094 | 7/2007 |
| WO | WO8802237 | 4/1988 |
| WO | WO9308734 | 5/1993 |
| WO | WO9319667 | 10/1993 |
| WO | WO9714112 | 4/1997 |
| WO | WO9843537 | 10/1998 |
| WO | WO9959465 | 11/1999 |
| WO | WO0033246 | 6/2000 |
| WO | WO0100085 | 1/2001 |
| WO | WO0147466 | 7/2001 |
| WO | WO0174011 | 10/2001 |
| WO | WO0180731 | 11/2001 |
| WO | WO0245489 | 6/2002 |
| WO | WO02058330 | 7/2002 |
| WO | WO02062276 | 8/2002 |
| WO | WO02087681 | 11/2002 |
| WO | WO03050643 | 6/2003 |
| WO | WO2004014225 | 2/2004 |
| WO | WO2004039256 | 5/2004 |
| WO | WO2004059551 | 7/2004 |
| WO | WO2004066834 | 8/2004 |
| WO | WO2004068748 | 8/2004 |
| WO | WO2004068881 | 8/2004 |
| WO | WO2004075751 | 9/2004 |
| WO | WO2004109316 | 12/2004 |
| WO | WO2005011237 | 2/2005 |
| WO | WO2005013503 | 2/2005 |
| WO | WO2005020023 | 3/2005 |
| WO | WO2005024687 | 3/2005 |
| WO | WO2005041767 | 5/2005 |
| WO | WO2005047837 | 5/2005 |
| WO | WO2005051166 | 6/2005 |
| WO | WO2005055448 | 6/2005 |
| WO | WO2005082436 | 9/2005 |
| WO | WO2005110238 | 11/2005 |
| WO | WO2006027586 | 3/2006 |
| WO | WO2006035351 | 4/2006 |
| WO | WO2006046648 | 5/2006 |
| WO | WO2006055892 | 5/2006 |
| WO | WO2006055956 | 5/2006 |
| WO | WO2006066566 | 6/2006 |
| WO | WO2006075016 | 7/2006 |
| WO | WO2006100620 | 9/2006 |
| WO | WO2006104843 | 10/2006 |
| WO | WO2006109072 | 10/2006 |
| WO | WO2006116718 | 11/2006 |
| WO | WO2006119345 | 11/2006 |
| WO | WO2006127355 | 11/2006 |
| WO | WO2007001724 | 1/2007 |
| WO | WO2007001742 | 1/2007 |

(56) References Cited

FOREIGN PATENT DOCUMENTS

| WO | WO2007013952 | 2/2007 |
|---|---|---|
| WO | WO2007014084 | 2/2007 |
| WO | WO2007014527 | 2/2007 |
| WO | WO2007021496 | 2/2007 |
| WO | WO2007027660 | 3/2007 |
| WO | WO2007028035 | 3/2007 |
| WO | WO2007036687 | 4/2007 |
| WO | WO2007036741 | 4/2007 |
| WO | WO2007036746 | 4/2007 |
| WO | WO2007040878 | 4/2007 |
| WO | WO2007071180 | 6/2007 |
| WO | WO2007096810 | 8/2007 |
| WO | WO2007101141 | 9/2007 |
| WO | WO2007120946 | 10/2007 |
| WO | WO2007127316 | 11/2007 |
| WO | WO2007127455 | 11/2007 |
| WO | WO2007127879 | 11/2007 |
| WO | WO2007128165 | 11/2007 |
| WO | WO2007130491 | 11/2007 |
| WO | WO2007143535 | 12/2007 |
| WO | WO2007149546 | 12/2007 |
| WO | WO2008002239 | 1/2008 |
| WO | WO2008008281 | 1/2008 |
| WO | WO2008030482 | 3/2008 |
| WO | WO2008052136 | 5/2008 |
| WO | WO2008063626 | 5/2008 |
| WO | WO2008066617 | 6/2008 |
| WO | WO2008076464 | 6/2008 |
| WO | WO2008089232 | 7/2008 |
| WO | WO2008091683 | 7/2008 |
| WO | WO2008095183 | 8/2008 |
| WO | WO2008097652 | 8/2008 |
| WO | WO2008101107 | 8/2008 |
| WO | WO2008112577 | 9/2008 |
| WO | WO2008112578 | 9/2008 |
| WO | WO2008120156 | 10/2008 |
| WO | WO2008133394 | 11/2008 |
| WO | WO2008134185 | 11/2008 |
| WO | WO2008150633 | 12/2008 |
| WO | WO2009001108 | 12/2008 |
| WO | WO2009006615 | 1/2009 |
| WO | WO2009029453 | 3/2009 |
| WO | WO2009031149 | 3/2009 |
| WO | WO2009036334 | 3/2009 |
| WO | WO2009051829 | 4/2009 |
| WO | WO2009051830 | 4/2009 |
| WO | WO2009063377 | 5/2009 |
| WO | WO2009081348 | 7/2009 |
| WO | WO2009111664 | 9/2009 |
| WO | WO2009146082 | 12/2009 |
| WO | WO2010009100 | 1/2010 |
| WO | WO2010011833 | 1/2010 |
| WO | WO2010019778 | 2/2010 |
| WO | WO2010057049 | 5/2010 |
| WO | WO2010075115 | 7/2010 |
| WO | WO2010080843 | 7/2010 |
| WO | WO2010105053 | 9/2010 |
| WO | WO2010107563 | 9/2010 |
| WO | WO2010115194 | 10/2010 |
| WO | WO2010132331 | 11/2010 |
| WO | WO2010135516 | 11/2010 |
| WO | WO2012104657 | 8/2012 |
| WO | WO2012158190 | 11/2012 |
| WO | WO2013012869 | 1/2013 |
| WO | WO2015042411 | 3/2015 |
| WO | WO2015112603 | 7/2015 |

OTHER PUBLICATIONS

AADE, "AADE 37th Annual Meeting San Antonio Aug. 4-7, 2010" American Association of Diabetes Educators (2010); http://www.diabeteseducator.org/annualmeeting/2010/index.html; 2 pp.

Arshak et al., A Review and Adaptation of Methods of Object Tracking to Telemetry Capsules IC-Med (2007) vol. 1, No. 1, Issue 1, 12 pp.

"ASGE Technology Status Evaluation Report: wireless capsule endoscopy" American Soc. for Gastrointestinal Endoscopy (2006) vol. 63, No. 4; 7 pp.

Au-Yeung, K., et al., "A Networked System for Self-Management of Drug Therapy and Wellness", Wireless Health '10, Oct. 5-7, 2010, San Diego, 9 pages.

Aydin et al., "Design and implementation considerations for an advanced wireless interface in miniaturized integrated sensor Microsystems" Sch. of Eng. & Electron., Edinburgh Univ., UK; (2003); abstract.

Barrie, Heidelberg pH capsule gastric analysis. Texbook of Natural Medicine, (1992), Pizzorno, Murray & Barrie.

Baskiyar, S. "A Real-time Fault Tolerant Intra-body Network" Dept. of Comp. Sci & Soft Eng; Auburn University; Proceedings of the 27th Annual IEEE Conference; 0742-1303/02 (2002) IEEE; 6 pp.

Brock, "Smart Medicine: The Application of Auto-ID Technology to Healthcare" Auto-ID Labs (2002) http://www.autoidlabs.org/uploads/media/MIT-AUTOID-WH-010.pdf.

Carlson et al., "Evaluation of a non-invasive respiratory monitoring system for sleeping subjects" Physiological Measurement (1999) 20(1): 53.

Delvaux et al., "Capsule endoscopy: Technique and indications" Clinical Gastoenterology (2008) vol. 22, Issue 5, pp. 813-837.

Description of ePatch Technology Platform for ECG and EMG, located it http://www.madebydelta.com/imported/images/DELTA_Web/documents/ME/ePatch_ECG_EMG.pdf, Dated Sep. 2, 2010.

Evanczuk, S., "PIC MCU software library uses human body for secure communications link" EDN Network; edn.com; Feb. 26 (2013) Retrieved from internet Jun. 19, 2013 at http://www.edn.com/electronics-products/other/4407842/PIC-MCU-software-library-uses-human-body-for-secure-communications-link; 5 pp.

Fawaz et al., "Enhanced Telemetry System using CP-QPSK Band-Pass Modulation Technique Suitable for Smart Pill Medical Application" IFIP IEEE Dubai Conference (2008); http://www.asic.fh-offenburg.de/downloads/ePille/IFIP_IEEE_Dubai_Conference.pdf.

Gilson, D.R. "Molecular dynamics simulation of dipole interactions", Department of Physics, Hull University, Dec. (2002), p. 1-43.

Given Imaging, "Agile Patency Brochure" (2006) http://www.inclino.no/documents/AgilePatencyBrochure_Global_GMB-0118-01.pdf; 4pp.

Gonzalez-Guillaumin et al., "Ingestible capsule for impedance and pH monitoring in the esophagus" IEEE Trans Biomed Eng. (2007) 54(12: 2231-6; abstract.

Greene, "Edible RFID microchip monitor can tell if you take your medicine" Bloomberg Businessweek (2010) 2 pp.; http://www.businessweek.com/idg/2010-03-31/edible-rfid-microchip-monitor-can-tell-if-you-take-your-medicine.html.

Halthion Medical Technologies "Providing Ambulatory Medical Devices Which Monitor, Measure and Record" webpage. Online website: http://www.halthion.com/; downloaded May 30, 2012.

Heydari et al., "Analysis of the PLL jitter due to power/ground and substrate noise"; IEEE Transactions on Circuits and Systems (2004) 51(12): 2404-16.

Hoover et al., "Rx for health: Engineers design pill that signals it has been swallowed" University of Florida News (2010) 2pp.; http://news.ufl.edu/2010/03/31/antenna-pill-2/.

Hotz "The Really Smart Phone" The Wall Street Journal, What They Know (2011); 6 pp.; http://online.wsj.com/article/SB10001424052748704547604576263261679848814.html?mod=djemTECH_t.

Intromedic, MicroCam Innovative Capsule Endoscope Pamphlet. (2006) 8 pp (http://www.intromedic.com/en/product/productinfo.asp).

ISFET—Ion Sensitive Field-Effect Transistor; Microsens S.A. pdf document. First cited by Examiner in Office Action dated Jun. 13, 2011 for U.S. Appl. No. 12/238,345; 4pp.

Jung, S. "Dissolvable 'Transient Electronics' Will Be Good for Your Body and the Environment" MedGadget; Oct. 1, 2012; Onlne

(56) References Cited

OTHER PUBLICATIONS website: http://medgadget.com/2012/10/dissolvable-transient-electronics-will-be-good-for-your-body-and-the-environment.html; downloaded Oct. 24, 2012; 4 pp.
Juvenile Diabetes Research Foundation International (JDRF), "Artificial Pancreas Project" (2010); http://www.artificialpancreasproject.com/; 3 pp.
Li, P-Y, et al. "An electrochemical intraocular drug delivery device", Sensors and Actuators A 143 (2008) p. 41-48.
Lifescan, "OneTouch UltraLink™" http://www.lifescan.com/products/meters/ultralink (2010) 2 pp.
Mackay et al., "Radio Telemetering from within the Body" Inside Information is Revealed by Tiny Transmitters that can be Swallowed or Implanted in Man or Animal Science (1991) 1196-1202; 134; American Association for the Advancement of Science, Washington D.C.
MacKay et al., "Endoradiosonde" Nature, (1957) 1239-1240, 179 Nature Publishing Group.
McKenzie et al., "Validation of a new telemetric core temperature monitor" J. Therm. Biol. (2004) 29(7-8):605-11.
Medtronic, "CareLink Therapy Management Software for Diabetes" (2010); https://carelink.minimed.com/patient/entry.jsp?bhcp=1; 1 pp.
Medtronic, "Carelink™ USB" (2008) http://www.medtronicdiabetes.com/pdf/carelink_usb_factsheet.pdf 2pp.
Medtronic "The New MiniMed Paradigm® Real-Time Revel™ System" (2010) http://www.medtronicdiabetes.com/products/index.html; 2 pp.
Medtronic, "Mini Med Paradigm® Revel™ Insulin Pump" (2010) http://www.medtronicdiabetes.com/products/insulinpumps/index.html; 2 pp.
Medtronic, Mini Med Paradigm™ Veo™ System: Factsheet (2010). http://www.medtronic-diabetes.com.au/downloads/Paradigm%20Veo%20Factsheet.pdf ; 4 pp.
Melanson, "Walkers swallow RFID pills for science" Engadget (2008); http://www.engadget.com/2008/07/29/walkers-swallow-rfid-pills-for-science/.
Minimitter Co. Inc. "Actiheart" Traditional 510(k) Summary. Sep. 27, 2005.
Minimitter Co. Inc. Noninvasive technology to help your studies succeed. Mini Mitter.com Mar. 31, 2009.
Mini Mitter Co, Inc. 510(k) Premarket Notification Mini-Logger for Diagnostic Spirometer. Sep. 21, 1999.
Mini Mitter Co, Inc. 510(k) Premarket Notification for VitalSense. Apr. 22, 2004.
Minimitter Co. Inc. VitalSense Integrated Physiological Monitoring System. Product Description. (2005).
Minimitter Co. Inc. VitalSense Wireless Vital Signs Monitoring. Temperatures.com Mar. 31, 2009.
Mojaverian et al., "Estimation of gastric residence time of the Heidelberg capsule in humans: effect of varying food composition" Gastroenterology (1985) 89:(2): 392-7.
"New 'smart pill' to track adherence" E-Health-Insider (2010) http://www.e-health-insider.com/news/5910/new_'smart_pil'_monitors_medicines.
Owano, N., "Study proposes smart sutures with sensors for wounds" phys.org. Aug. 2012. http://phys.org/news/2012-08-smart-sutures-sensors-wounds.html.
Park, "Medtronic to Buy MiniMed for $3.7 Billion" (2001) HomeCare; http://homecaremag.com/mag/medical_medtronic_buy_minimed/; 2 pp.
Radio Antennae, http://www.erikdeman.de/html/sail018h.htm; (2008) 5 pages.
"RFID "pill" monitors marchers" RFID News (2008) http://www.rfidnews.org/2008/07/23/rfid-pill-monitors-marchers/.
Sanduleanu et al., "Octave tunable, highly linear, RC-ring oscillator with differential fine-coarse tuning, quadrature outputs and amplitude control for fiber optic transceivers" (2002) IEEE MTT-S International Microwave Symposium Digest 545-8.
Santini, J.T. et al, "Microchips as controlled drug delivery-devices", Agnew. Chem. Int. Ed. (2000), vol. 39, p. 2396-2407.
"SensiVida minimally invasive clinical systems" Investor Presentation Oct. 2009 28pp; http://www.sensividamedtech.com/SensiVidaGeneralOctober09.pdf.
Shawgo, R.S. et al. "BioMEMS from drug delivery", Current Opinion in Solid State and Material Science 6 (2002), p. 329-334.
Shrivas et al., "A New Platform for Bioelectronics-Electronic Pill", Cummins College, (2010).; http://www.cumminscollege.org/downloads/electronics_and_telecommunication/Newsletters/Current%20Newsletters.pdf; First cited in third party client search conducted by Patent Eagle Search May 18, 2010 (2010).
"Smartlife awarded patent for knitted transducer" Innovation in Textiles News: http://www.innovationintextiles.com/articles/208.php; 2pp. (2009).
"The SmartPill Wireless Motility Capsule" Smartpill, The Measure of GI Health; (2010) http://www.smartpillcorp.com/index.cfm?pagepath=Products/The_SmartPill_Capsule&id=17814.
Solanas et al., "RFID Technology for the Health Care Sector" Recent Patents on Electrical Engineering (2008) 1, 22-31.
Soper, S.A. et al. "Bio-Mems Technologies and Applications", Chapter 12, "MEMS for Drug Delivery", p. 325-346 (2007).
Swedberg, "University Team Sees Ingestible RFID Tag as a Boon to Clinical Trials" RFID Journal Apr. 27, 2010; http://www.rfidjournal.com/article/view/7560/1.
Tajalli et al., "Improving the power-delay performance in subthreshold source-coupled logic circuits" Integrated Circuit and System Design. Power and Timing Modeling, Optimization and Simulation, Springer Berlin Heidelberg (2008) 21-30.
Tatbul et al., "Confidence-based data management for personal area sensor networks" ACM International Conference Proceeding Series (2004) 72.
Tierney, M.J. et al "Electroreleasing Composite Membranes for Delivery of Insulin and other Biomacromolecules", J. Electrochem. Soc., vol. 137, No. 6, Jun. 1990, p. 2005-2006.
Xiaoming et al., "A telemedicine system for wireless home healthcare based on bluetooth and the internet" Telemedicine Journal and e-health (2004) 10(S2): S110-6.
Yang et al., "Fast-switching frequency synthesizer with a discriminator-aided phase detector" IEEE Journal of Solid-State Circuits (2000) 35(10): 1445-52.
Yao et al., "Low Power Digital Communication in Implantable Devices Using Volume Conduction of Biological Tissues" Proceedings of the 28th IEEE, EMBS Annual International Conference, Aug. 30-Sep. 3, 2006.
Zimmerman, "Personal Area Networks: Near-field intrabody communication" IBM Systems Journal (1996) 35 (3-4):609-17.
Zworkin, "A Radio Pill" Nature, (1957) 898, 179 Nature Publishing Group.
Walkey, David J., 97.398, Physical Electronics, Lecture 20, MOSFET Structure and Processing, Carleton University, Ottawa, Canada, Oct. 26, 2008 (24 pages).

* cited by examiner

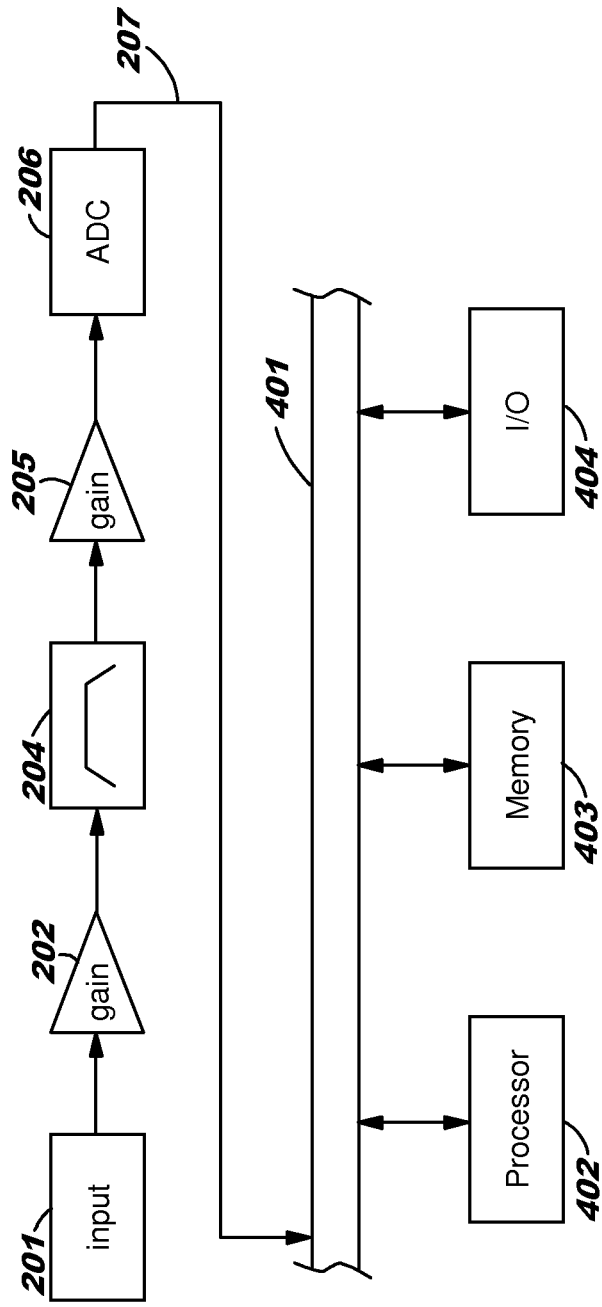

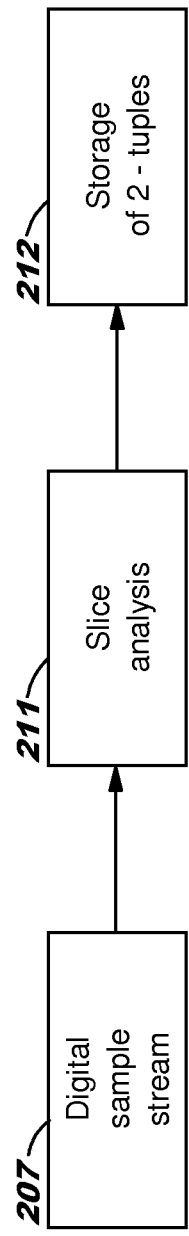
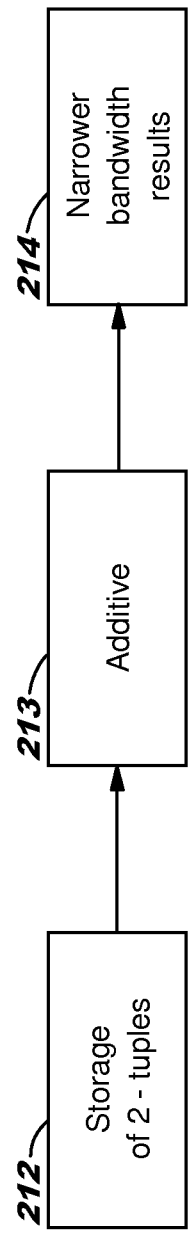
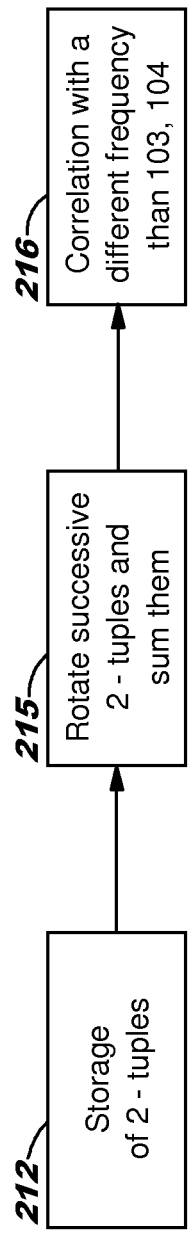

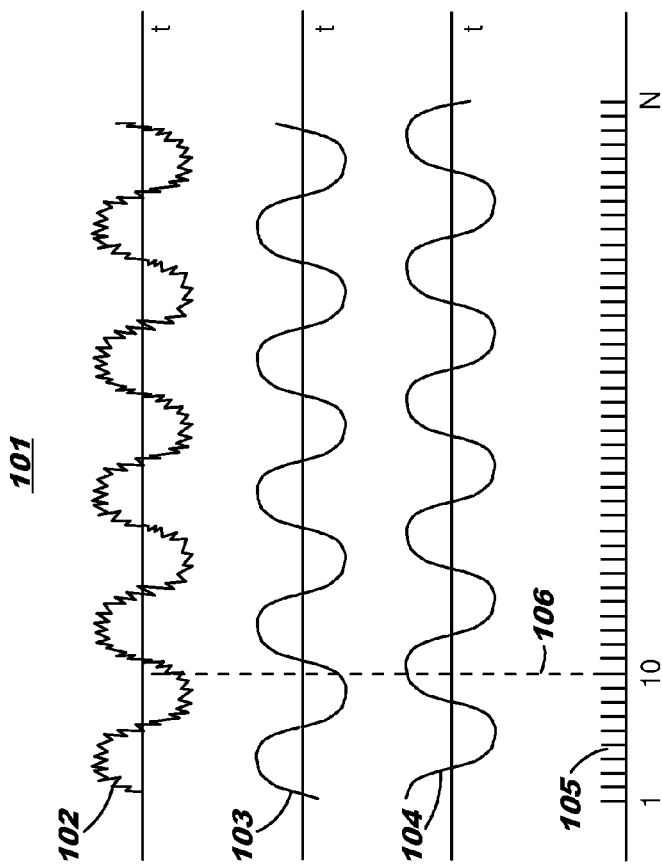

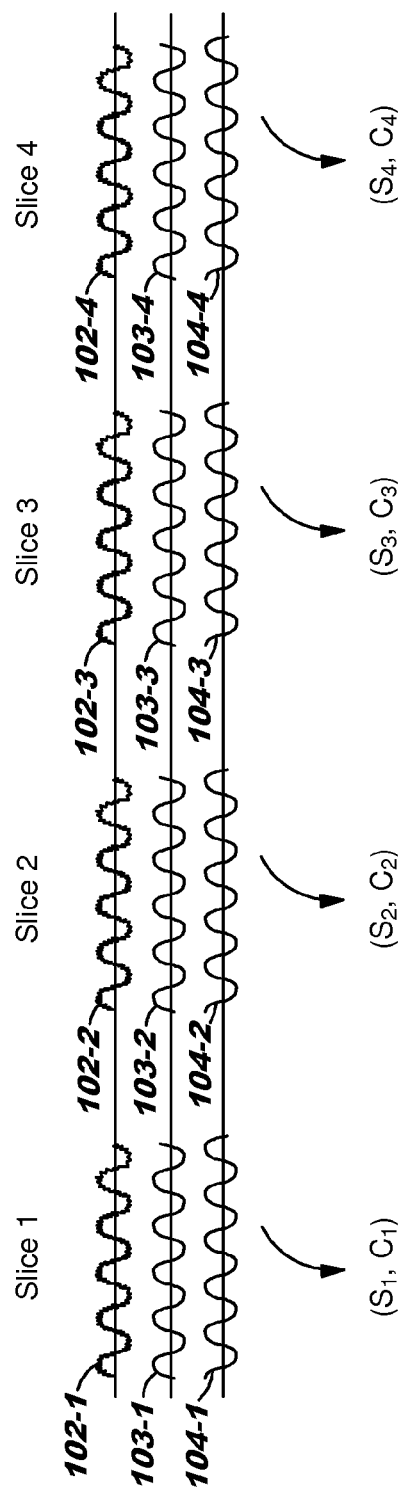

METHOD AND APPARATUS FOR USE WITH RECEIVED ELECTROMAGNETIC SIGNAL AT A FREQUENCY NOT KNOWN EXACTLY IN ADVANCE

CROSS REFERENCE TO RELATED APPLICATIONS

The present application is a U.S. national phase application filed under 35 U.S.C. §371 of International Patent Application No. PCT/IB2013/059084, entitled METHOD AND APPARATUS FOR USE WITH RECEIVED ELECTROMAGNETIC SIGNAL AT A FREQUENCY NOT KNOWN EXACTLY IN ADVANCE, filed Oct. 3, 2013, which application claims the benefit under 35 U.S.C. §119(e) of U.S. Provisional Application No. 61/881,555 entitled METHOD AND APPARATUS FOR USE WITH RECEIVED ELECTROMAGNETIC SIGNAL AT A FREQUENCY NOT KNOWN EXACTLY IN ADVANCE filed Sep. 24, 2013, the disclosures of which are herein incorporated by reference.

BACKGROUND

Some real-life situations involving reception of electromagnetic signals are relatively easy, for example where the transmitted signal is known to be at a particular exact frequency due to its being crystal controlled. As another example a signal that lasts a long time is relatively easy to receive and analyze. A signal that is repeated as often as necessary, for example in a system where packets are acknowledged and an unacknowledged packet is retransmitted, can be relatively easily received. As another example if a transmitter has the luxury of a high power level and the further luxury of an optimally sized antenna, this makes the signal easier to receive relative to ambient noise. Another thing that can make reception of an electromagnetic signal easier is if the designer is able to assume that the receiver has plenty of storage and high computational bandwidth as well as a generous power source.

Some real-life situations, however, do not offer any of these factors that would make reception of signals easy. Suppose, for example, that the transmitter is not crystal controlled and thus the designer of the receiver is not permitted to assume that the transmitted signal is at any particular exact frequency. Suppose that the transmitter is required to be physically small in form factor and thus that any antenna elements are severely constrained in size. Suppose the transmitter has a power source that does not last very long, so that any transmitted signal lasts only for a limited duration. Suppose further that the power source is not very strong, so that the transmitted signal is of only very limited strength. Suppose that the transmitter is not also a receiver, so that there is no prospect of defining a packet acknowledgment protocol that would permit selective retransmission of particular packets only when needed.

Suppose that the designer is not able to assume that the receiver has arbitrarily large data storage and is not able to assume that the receiver has arbitrarily high computational bandwidth. Suppose further that the receiver cannot be assumed to have an arbitrarily generous power source.

In such circumstances, few if any prior-art approaches turn out to provide suitable reception of the transmitted signals.

These circumstances do present themselves in real life, for example if a pill contains an IEM (ingestible event marker) and if the would-be receiver is a patch or other detector affixed to or nearby to the body of a subject that is to ingest the IEM. Such IEMs are not crystal controlled and so their transmitted signal cannot be assumed to be at any particular exact frequency. Such IEMs are powered by contact with gastric juices or other fluids within the body of the subject, and the contact-powered power source only lasts for a limited duration.

In recent times it has become commonplace to carry out reception of electromagnetic signals in what might be termed a "software receiver". As shown in FIG. 2, an input signal 201 is received (for example by an antenna) and the signal is amplified at 202. The amplified signal is passed through a bandpass filter 204 which eliminates most or all noise at frequencies above and below the edges of the filter. The filtered signal is again amplified at 205 and is digitized in an analog-to-digital converter 206, yielding a digital sample stream 207 about which more will be said.

The signal-to-noise ratio is one of the strongest predictors of success in reception of any transmitted signal. One way to improve the signal-to-noise ratio is to sharpen the bandpass filter shown in FIG. 1 as filter 203. Narrowing the filter 203 (as compared with the filter 204 of FIG. 2) has the advantage that noise that is outside of the limits of filter 203 (but that was inside of the limits of filter 204) is noise that will not clutter up the analyzed signal in FIG. 1 even though such noise would have cluttered up the analyzed signal in FIG. 2.

But if the filter 203 is narrowed, there is the risk that the actual transmitted signal is outside of the limits of filter 203, in which case the receiver of FIG. 1 will miss the signal completely and will never pick it up.

In situations (such as the IEM situation mentioned above) where one does not have the luxury of being able to assume that the signal to be detected is at some particular exact frequency, the narrower filter 203 cannot be employed. Instead there is no choice but to leave filter 204 (FIG. 2) so very broad as to be able to pass the signal-to-be-detected at any of its possible frequencies. Any application of a narrower bandpass filter will have to be relegated to a controllable filter that is able to be adjusted upwards and downwards in frequency ("hunting") until the actual frequency of the signal is determined. In a typical present-day software receiver, such a controllable filter is accomplished in software.

Only when the frequency (or frequencies, in the case of frequency-shift keying) has been discovered can further analysis be carried out for example to extract data from the signal. Such data might be phase-shift keyed, or amplitude keyed, or frequency-shift keyed, or communicated by some other more complex modulation.

The alert reader may be familiar with some of the ways that a present-day software receiver gets programmed to carry out digital filtering and further analysis. FIG. 3 shows one approach, namely storage in mass storage 208 of the entirety of the digital sample stream 207. Analysis at block 209 is carried out on the data stored at 208. It will be appreciated that depending on the sample rate of the ADC 206, and the resolution (number of bits per sample) of the ADC 206, even just a few minutes of storage of raw data can require an enormous storage device 208. But in situations (such as described above) where the receiver has limited memory resources, the storage of the entirety of the digital sample stream (raw data) is just not possible.

The alert reader may also be familiar with some of the design decisions made by designers of analysis 209. Such designers may, for example, assume that multiple analyses can be carried out one after the other (or may be run in parallel with suitable parallel hardware) on the entirety of the data in mass storage 208. One analysis tries to pick out one would-be signal frequency, a subsequent analysis tries another frequency, until (hopefully) the hunt succeeds and the actual transmitted frequency is determined. Such analyses require substantial computational bandwidth and corresponding amounts of power for the analytical hardware. But in situations (such as described above) where the receiver has limited computational bandwidth or limited power or both, it is just not possible to proceed in this way.

A further big challenge presents itself when the sought-after transmitted signal is ephemeral, that is, it does not persist for very long after it has started. Prior-art approaches that attempt to pick out the signal by means of a "hunting" process are approaches that run the risk of taking so long to succeed at the hunt that the signal may have come and gone. Some prior-art systems when faced with an ephemeral signal of frequency that is not known in advance will run a massively parallel set of relatively narrow-band receivers so that no matter which frequency turns out to be the transmitted frequency, one or another of the receivers will have picked up the entire transmission. Other prior-art systems when faced with an ephemeral signal of frequency that is not known in advance will run a single relatively broad-band receiver and will attempt to store absolutely everything that was received (digitally) and then to conduct post-receipt analysis over and over again until some digital filter happens to have picked out the signal from the noise. These approaches require lots of hardware, and lots of power. These approaches are expensive and cannot be reduced in size to desirably small form factors.

It would be very helpful if an approach could be devised which would permit picking out a signal even when one is not able to know in advance exactly what frequency the signal will be at, and to do this in a way that does not require prodigious data storage capacity, and that does not require prodigious computational bandwidth.

SUMMARY OF THE INVENTION

In a software receiver, a received electromagnetic signal is sampled in "slices", each having a duration of some multiple of a reference frequency. The samples of each slice are correlated with values in a pair of reference signals, such as sine and cosine, at the reference frequency. This yields a two-tuple for each slice, which two-tuples may be stored. The stored two-tuples can be simply added to arrive at a correlation value of narrower bandwidth than that of any slice taken alone. The stored two-tuples can be taken in sequence, each rotated by some predetermined angle relative to its predecessor in sequence, and the rotated two-tuples summed to arrive at a correlation value with respect to a frequency that is offset from the reference frequency to an extent that relates to the predetermined angle. In this way, the receiver is able to proceed despite the transmitted frequency not being known exactly in advance and does not require prodigious storage or computational resources.

DESCRIPTION OF THE DRAWING

The invention is described with respect to a drawing in several figures, of which:

FIG. 2 shows a software receiver with a relatively broad-band filter;

FIG. 5 shows an approach according to the invention in which "slicing" is carried out and two-tuples are stored indicative of a correlation calculation relative to a reference frequency;

FIG. 6 shows an approach according to the invention in which two-tuples corresponding to a number of slices are simply added up, the result being a narrower bandwidth result than that of any single slice taken alone;

FIG. 7 shows an approach according to the invention in which two-tuples corresponding to a number of slices are rotated, each more than its predecessor, and then the rotated two-tuples are added, the result being a correlation with respect to a different frequency than the reference frequency;

FIG. 8 shows a sample received signal and "sine" and "cosine" reference waveforms for a "slice"; and FIG. 9 shows a time sequence of several slices.

Where possible, like reference numerals have been employed to denote like items.

SPECIFICATION

Figure 1:
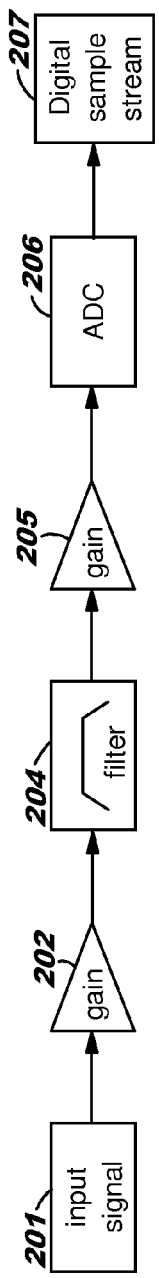
FIG. 1 shows a software receiver with a relatively narrow-band filter.

As mentioned above, according to the invention, in a software receiver, a received electromagnetic signal is sampled in "slices", each having a duration of some multiple of a reference frequency. The samples of each slice are correlated with values in a pair of reference signals, such as sine and cosine, at the reference frequency. This yields a two-tuple for each slice, which two-tuples may be stored. The stored two-tuples can be simply added to arrive at a correlation value of narrower bandwidth than that of any slice taken alone. The stored two-tuples can be taken in sequence, each rotated by some predetermined angle relative to its predecessor in sequence, and the rotated two-tuples summed to arrive at a correlation value with respect to a frequency that is offset from the reference frequency to an extent that relates to the predetermined angle. In this way, the receiver is able to proceed despite the transmitted frequency not being known exactly in advance and does not require prodigious storage or computational resources.

FIG. 5 shows an approach according to the invention in which "slicing" is carried out and two-tuples are stored indicative of a correlation calculation relative to a reference frequency. The digital sample stream 207 is subjected to a "slice" analysis 211 which will be discussed in greater detail below in connection with FIG. 8. The result of the slicing is the development of a two-tuple (an ordered pair of two scalar values) for each slice, and the two-tuples are stored at step 212.

FIG. 6 shows an approach according to the invention in which two-tuples (stored at 212) corresponding to a number of slices are simply added up (step 213), the result being a narrower bandwidth result 214 than that of any single slice taken alone. This will be discussed in more detail below.

FIG. 7 shows an approach according to the invention in which two-tuples (stored at 212) corresponding to a number of slices are rotated, each more than its predecessor (part of step 215), and then the rotated two-tuples are added (also part of step 215), the result being a correlation with respect to a different frequency than the reference frequency (result 216). This will be discussed in more detail below.

FIG. 8 shows a sample received signal 102 and "sine" and "cosine" reference waveforms, 103 and 104 respectively, for a "slice". This portrayal shows what happens in box 211 of FIG. 5. The received signal 102 is, in this case, shown as a sinusoidal waveform correlating strongly with waveform 103, but this is shown simply as an example. In this case the unaided eye can readily pick out that the waveform 102 is fundamentally sinusoidal at very nearly the same frequency of reference waveforms 103 and 104, and that it is very nearly in phase with reference waveform 103. Although a modest amount of noise is portrayed for signal 102 in FIG. 8, the noise does not keep the unaided eye from readily discerning the waveform. In real-life situations of course the invention has the goal of dealing with received signals 102 that may not yield to the unaided eye at all, that may not be of any particular readily discerned frequency, and that may at least at first glance have noise that overwhelms any supposed signal.

The system makes use of reference waveforms 103 and 104. In FIG. 8 these are sinusoidal waveforms one of which lags the other by 90 degrees. It is convenient to define a term "slice" which represents some period of time, perhaps four or eight cycle times of the reference frequency. In FIG. 8 we can see five cycle times of the reference frequency as shown in waveforms 103 and 104, extending from the left side of the figure to the right side of the figure. Line 105 is intended to portray a number of sampling moments in time during the slice. In this figure what is shown is N sampling moments between the start of the first cycle (at the reference frequency) and the end of the fifth cycle (at the reference frequency). For example at the tenth sampling moment (shown by dotted line 106) the instantaneous magnitude of the waveform 102 is multiplied by the instantaneous magnitude of the waveform 103. (This may be termed a "dot product".) The scalar result of this multiplication associated with the tenth sampling moment is indicative to some limited extent of the degree of correlation between the waveform 102 and the waveform 103. At this same tenth sampling moment (shown by dotted line 106) the instantaneous magnitude of the waveform 102 is multiplied by the instantaneous magnitude of the waveform 104. (This may likewise be termed a "dot product".) The scalar result of this multiplication associated with the tenth sampling moment is indicative to some limited extent of the degree of correlation between the waveform 102 and the waveform 104.

The dot-product or multiplication is carried out not only for sampling moment ten (at line 106) but also at N−1 other sampling moments, developing N dot products associated with the sine wave (waveform 103) and the cosine wave (waveform 104). As shown by the summation formulas at the bottom of FIG. 8, the dot products associated with waveform 103 are summed to yield a single scalar number "s" and the dot products associated with waveform 104 are summed to yield a single scalar number "c". These two scalar values form a two-tuple associated with the particular slice portrayed in this FIG. 8.

In the very artificial example shown here, with received signal 102 being shaped so that the unaided eye has no problem picking out that it correlates very strongly with waveform 103, the value "s" will be a big number. Assuming that waveforms 102 and 103 have been normalized so that the peaks are at a value of unity, then the value "s" will be about N. It may be convenient likewise to scale the result of the summation with a scaling factor 1/N so that the maximum value for "s" is approximately unity. But the normalization or scaling is merely a matter of computational convenience and is not required for the invention to deliver its benefits, as will be better understood as the explanation herein continues.

The alert reader will appreciate that in the case (a case thought to be optimal) where the waveforms 103 and 104 are 90 degrees out of phase, any similar set of samples and dot products between waveforms 103 and 104 would sum to a value very chose to zero. Said differently, in such a case waveforms 103 and 104 are orthogonal to each other. From this we can see that in the very artificial example shown here, where received signal 102 correlates strongly with reference waveform 103, we can guess what value "c" would turn out to have. Value "c" would turn out to be close to zero.

In the more general case, s and c would assume any of a range of values rather than the artificial "1" and "0" values that follow from the waveforms shown in FIG. 8.

In any event, after the slice of FIG. 8 is analyzed (box 211 in FIG. 5) to yield a two-tuple (s, c) that is stored (box 212 in FIG. 5), then successive slices can be analyzed to yield more two-tuples that may be stored. The result can be a large number of two-tuples. Later we will discuss in some detail the things that can be done with the stored two-tuples.

The alert reader will appreciate that even if it is thought to be optimal for the reference waveforms to be sinusoidal, the invention can be made to work with reference waveforms of other periodic shapes such as sawtooth, triangle, or square waves. (This might simplify computations for some choices of hardware.) The correlations that permit working out the frequency of the received signal, and that permit working out its phase if needed, can be correlations between the received signal and almost any periodic shape. One is probably discarding some information by correlating to a non-sinusoidal periodic waveform rather than to a sinusoidal waveform, but even if some information is discarded it may be possible to extract the desired frequency and phase information from the received signal.

The alert reader will also appreciate that even if it is thought to be optimal for the reference waveforms to be 90 degrees out of phase with each other, the teachings of the invention offer their benefits for other possible phase relationships. For example the two reference waveforms could be 89 degrees or 91 degrees out of phase with very little loss of analytical power.

It may be helpful to return briefly to the receiver of FIG. 2 to say more about the hardware. First the analog-to-digital converter 206 might have any of a range of resolutions— from as much as 16-bit or 10-bit resolution down to a mere one bit of resolution. (In the latter case the A/D converter is simply a comparator.) The digital sample stream passes to a processor 402 by a general-purpose parallel data bus 401, and is slice-analyzed and the two-tuples stored in memory 403. Results of the frequency and phase analysis get communicated at I/O 404 to points that are external to the receiver. The processor 402 carries out the steps of the method according to the invention by executing instructions stored in memory 403.

But the reader will immediately appreciate that many types of hardware could deliver the benefits of the invention. The hardware designer might pick a microcontroller that contains both the processor 402 and the memory 403 as well as I/O 404. The hardware designer might relegate some of the steps of the method to one or more field-programmable gate arrays or to one or more application-specific integrated circuits. As yet another example the designer might make use of a DSP (digital signal processor) to carry out some or all of the described functions. Any of these hardware choices, or others not mentioned, could be employed without departing from the invention itself.

By the term "processor" it is intended to encompass any hardware carrying out the computations just discussed, for example a processor within a microcontroller, as just mentioned, or circuitry within a field-programmable gate array, or circuitry within one or more application-specific integrated circuits, or circuitry within a DSP.

The sampling rate at the A/D converter (box 206 in FIG. 2) may for simplicity of operation be the same as the sampling rate for the "slice" analysis (line 105 in FIG. 8). Generally one would wish to pick a sampling rate that is at least as often as Nyquist would suggest (twice the frequency of interest) and it is thought that a higher sampling rate (perhaps five or more times the frequency of interest) may be preferable. In one embodiment the receiver system (located in a path affixed to the abdomen of the subject) carries out about forty or more samples per slice.

In one embodiment the signal emitted by the IEM may last for a few minutes (perhaps 4 or 7 or 10 minutes) but will likely not last longer than that. The signal emitted by the IEM might be around 12 kHz or around 20 kHz, in which case a slice duration might be around 400 microseconds.

In one implementation example the carrier frequency emitted by the IEM is around 20 kHz. The reference frequency is 20 kHz. The ADS samples 160 samples per cycle of the carrier, which is 3.2 million samples per second. The microcontroller in this example is able to execute 16 million instructions per second. A slice, in this implementation, is defined as four cycles of the reference frequency. This means there are 640 samples per slice. There are thus about 21 processor cycles available between each cycle.

Figure 4:
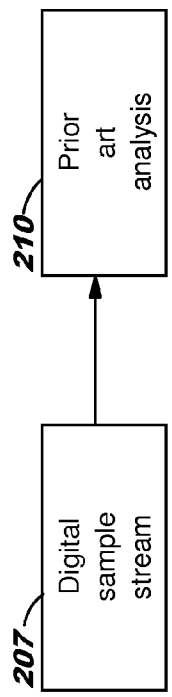
FIG. 4 shows a prior-art approach using prior-art analysis approaches.

In a prior-art analysis such as that of box 4 of FIG. 4, the 21 processor cycles would be completely inadequate to keep up with the digital sample stream 207. But it is within grasp to carry out the dot products and the two summations of FIG. 8 within the 21 processor cycles.

The amount of data storage required is also worthy of discussion. The prior-art approach of FIG. 3 might require storing 640 digital words per slice. The approach of FIG. 8 might require a mere two digital words. The compression benefit of the slice analysis might be 640 to 2 or 320 to 1, which is two orders of magnitude of reduction in memory requirements.

Figure 3:
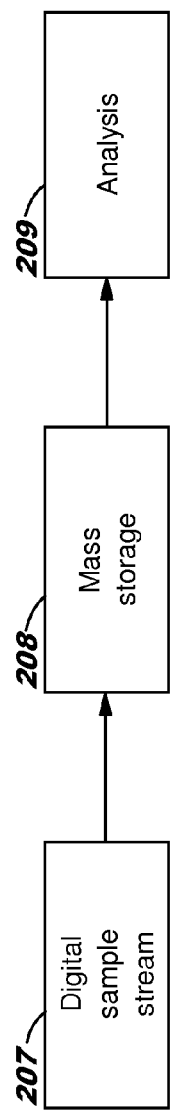
FIG. 3 shows a prior-art approach using mass storage of the entirety of a digital sample stream.

FIG. 3 reminds us that in some applications (where memory, computational bandwidth, and power are all plentiful and cost-free) one might in the first instance store in bulk all of the data developed by the ADS 206 (FIG. 1 or 2). Such storage at 208 could easily add up to millions of samples and tens of millions of bits for just a second or two of captured signal. Stored digital data for several minutes could add up to gigabits of data to be stored and later analyzed. Such analysis at box 209 (FIG. 3) requires much computation.

FIG. 4 proposes that the prior-art analysis (at box 210) be done in real time, and with respect to a digital sample stream of some millions or tens of millions of bits per second.

Returning briefly to the subject of digital filter bandwidth, the slice correlation calculation represents a filter with a bandwidth of something like 1 over the slice time, which is 20000/4 or about 5 kHz. This is relatively broad bandwidth, when compared with the carrier of perhaps 20 kHz.

But when several slices are combined (by adding up the respective two-tuples of the slices) the bandwidth gets narrower. Combining five slices means the effective slice time is five times as long, so that the bandwidth is closer to 1 kHz, a relatively narrow bandwidth when compared with the same carrier of perhaps 20 kHz.

The reader will appreciate that this permits "hunting" for a frequency that is offset by some amount from the reference frequency. If the reference frequency is 20 kHz and if the one-slice bandwidth is 5 kHz then one has a chance of picking up a carrier (in a received signal) that is in the range of perhaps 18-22 kHz. (Depending on ambient noise and other factors the range might be even more forgiving.) Once the carrier has been picked up, then the slices can be combined, thus applying a narrower filter to the identified frequency.

The teaching of the invention is, once again, a powerful one. If we collect some data in five slices, we can start with a broad bandwidth filter and then go back into the past (the data already collected) and nearly effortlessly apply a much narrower filter to the data already collected, just by adding up two sets of five numbers.

FIG. 8 provides a visual sense of the prior-art data storage needs and the data storage needs for the present invention. The prior-art storage approach would call for storing the entirety of waveform 102. Depending on the sample rate and the A/D resolution this might add up to 40 bits or 600 bits of data, or more. In contrast according to the invention one might store only the two scalars "s" and "c". This might be 16 bits.

FIG. 9 shows a time sequence of several slices 1, 2, 3, and 4. Suppose that we wish that we had done a single slice that lasts as long as the four slices when laid out in time sequence? Because the calculations (the summation formulas in FIG. 8) are simply additive, then we can simply add together the four two-tuples (one for each of the four slices) and we end up with a two-tuple that is just what we would have gotten if we had done a single slice that had lasted as long as the four slices.

The adding-up of the four slices (that is, the adding-up of the four two-tuples) yields a result that represents a narrower filter (narrower bandwidth) as compared with the filter (or bandwidth) associated with any one of the four original slices. In this way one may arrive at a narrower-band filter result by simply manipulating information that was already in memory.

This discussion helps to show one of the advantages of the inventive slice-based approach as compared with some prior-art approaches. In the prior-art approach of FIG. 3, if we were first to do some wide-band filtering and analysis, and if later we were to determine that we wish to do some narrow-band filtering and analysis, this might well require substantial computation (including operations such as multiplication that consume more computational resources as compared with mere addition) and might require manipulating much more data (for example some or all of the x and y data points of the waveform 102 in FIG. 8). The computation 209 might not lend itself to being done in real time, but might lag behind the flow of the digital data stream 207.

In contrast the approach of the invention might only require adding up a few simple numbers. This might be accomplished at real time or much faster than real time.

It is helpful to say a few more words about the sequence of slices suggested by FIG. 9. For the slices to be combinable as discussed here, the reference signals 103-1, 103-2, and so on need to be coherent, meaning that they are in phase with each other. The same is required of the reference signals 104-1, 104-2 and so on.

For convenience of hardware design and convenience of calculation, the starting times of the slices 1, 2, 3, and 4 and so on will probably be selected to be periodic according to some fixed interval. The slices might be contiguous in time (slice 2 starting the instant that slice 1 ended). But many of the teachings of the invention offer their benefits even if (as suggested in FIG. 9) there are brief periods of time between slices when no sampling is going on and no data being captured.

The discussion up to this point in connection with FIGS. 8 and 9 treats the idealized case where through some good luck the received signal (at 102) happened to be at the same frequency as the reference frequency (at 103 and 104). As has been mentioned above, however, the teachings of the invention are intended to address situations where the frequency of the received signal is not known accurately in advance but is only known very approximately or roughly. It will now be helpful to discuss how the approach of the invention permits detecting a frequency that is not the same as the reference frequency. This rather remarkable result turns out to be achievable without requiring storing large amounts of data, and turns out to be achievable without requiring enormous computational bandwidth or large amounts of power.

To understand how this approach can detect a frequency that is not the same as the reference frequency, it may be helpful to review the notion of how we rotate a vector. To rotate a vector by an angle θ, we multiply it by a rotation matrix $$R = \begin{bmatrix} \cos\theta & -\sin\theta \\ \sin\theta & \cos\theta \end{bmatrix}$$

So for example suppose the incoming signal is a 12600 Hz. Of course we do not yet know that it is at that frequency. Our goal will be to figure out what its frequency is. Suppose further that the reference frequency that was employed in the slice analysis was 12500 Hz. This means we hope to "retune" our data by 100 Hz.

We can then apply the rotation matrix to the two-tuples, one after the next. The two-tuple for the first slice is left unchanged (no rotation). We take the two-tuple for the second slice and we rotate it by some angle θ. We take the two-tuple for the third slice and we rotate it by 2θ. We take the two-tuple for the fourth slice and we rotate it by 3θ. We then add up all the first two-tuple and we add up the rotated two-tuples (the second through fourth two-tuples in this case). This yields a narrow-band filter of the incoming data that is narrowly focused on some other frequency (perhaps the 12600 Hz frequency).

The mathematical relationship between θ and the desired offset (here, 100 Hz) is straightforward and depends upon depends for example upon such things as the size of the gaps in FIG. 9 between the end of one slice and the start of the next slice.

Again suppose the reference frequency used in the slice analysis was 12500 Hz, but suppose we wish to go hunting to try to see if the incoming signal is actually at 12400 Hz. If previously we had worked out which angle θ was the correct angle to retune the filter to 12600 Hz, then this tells us that we can use −θ (the opposite of the previous angle) to retune the filter to 12400 Hz.

Repeating a point made earlier, this permits the system to go hunting around for the actual frequency of the incoming signal by trying out various values for θ until a value is found that yields a high correlation value (the sum of the rotated two-tuples turns out to be high). When this value has been found, then we have succeeded at the hunt—we have determined the frequency of the incoming signal.

Such hunting can be easily done, based upon an astonishingly small amount of stored data. A half a dozen or a dozen two-tuples (memorializing what was extracted from the data of half a dozen or a dozen slices) might permit hunting up and down in frequency until the actual incoming frequency has been found. All of this can be done with quite modest data storage and fairly undemanding calculations. Importantly there is no need to go back to the original raw data stream (for example data 102 in FIG. 8) nor is there any need to wait for a new raw data stream to arrive.

The alert reader will now appreciate one of the some of the very interesting of the invention. Suppose the incoming data is modulated with an FSK (frequency shift keying) modulation with two frequencies, one representing a "0" and the other representing a "1". The approach just described can permit hunting for and locating the two frequencies, and can then permit easy detection of the presence of the one frequency or the other so as to detect 0s and 1s in a data stream. All of this can be done with only modest computational resources and can be done based upon mere stored two-tuples. Again there is no need to go back to the original raw data stream (for example data 102 in FIG. 8) nor is there any need to wait for a new raw data stream to arrive.

It will be recalled that where IEMs are involved, the signal of interest may last only a few minutes such as four or seven or ten minutes. It may turn out to be possible to capture and store slice data for several minutes, and then even if the signal ends, it may be possible to go back and analyze and re-analyze the stored slice data at a later time after the signal has ended. Such analyzing and re-analyzing may permit detecting the frequencies involved even though the signal has ended. The stored data to permit going back and analyzing and re-analyzing will be modest in size (as mentioned above, maybe $\frac{1}{320}^{th}$ of the data that would have needed to be stored using prior-art approaches) and the analysis and re-analysis will require only modest computational bandwidth as compared with that required for prior-art approaches that direct themselves to the raw data.

It is interesting to consider the detection of a data stream that has been phase-shift-keyed ("PSK"). Once the carrier frequency for a PSK signal has been determined using the hunting approach discussed above, it will then be desired to detect the phase shifts. This can be done by closely following the magnitudes of the first elements of each two-tuple and comparing them with the magnitudes of the second elements of each two-tuple. These comparisons may permit working out when the phase has shifted to one keying value and when it has shifted to the other keying value.

A related approach is to use the phase angle (defined by the two elements of each two-tuple) detected during one interval to define an initial phase in the received signal. Then during some later interval the phase angle (again defined by the two elements of each two-tuple) might be about the same, in which case we will say that the keying is the same as during the initial interval. Then during some third interval the phase angle (yet again defined by the two elements of each two-tuple) might be notably different (perhaps advanced or lagged by some phase angle such as 90 degrees) in which case we will say that the keying has changed to a different keyed value.

The invention claimed is:
1. A method for use with respect to a received electromagnetic signal, the method carried out with respect to a reference frequency, the method comprising:
passing the received electromagnetic signal through an analog front end;

passing the signal thence to an analog-to-digital converter having an output, the output defining a resolution thereof;

sampling the output of the analog-to-digital converter at a sampling rate, the sampling rate being at least as frequent as twice the reference frequency, the samples thereby defining a time series of samples;

for a first number of samples exceeding the duration of one cycle at the reference frequency, said first number of cycles defining a first slice, carrying out a first correlation calculation arriving at a first scalar correlation value with respect to the first slice relative to a first reference waveform at the reference frequency;

for the samples defining the first slice, carrying out a second correlation calculation arriving at a second scalar correlation value with respect to the first slice relative to a second reference waveform at the reference frequency, the second reference waveform having a non-zero phase difference from the first reference frequency;

the first scalar correlation value with respect to the first slice and the second scalar correlation value with respect to the first slice defining a two-tuple for the first slice; and storing the two-tuple for the first slice in a physical memory.

2. The method of claim 1 further comprising the steps of:
for a second number of samples exceeding the duration of one cycle at the reference frequency, said second number of cycles defining a second slice, carrying out a first correlation calculation arriving at a first scalar correlation value with respect to the second slice relative to the first reference waveform;

for the samples defining the second slice, carrying out a second correlation calculation arriving at a second scalar correlation value with respect to the second slice relative to the second reference waveform;

the first scalar correlation value with respect to the second slice and the second scalar correlation value with respect to the second slice defining a two-tuple for the second slice; and storing the two-tuple for the second slice in the physical memory.

3. The method of claim 2 wherein the carrying-out of correlation calculations and the storage in the physical memory are repeated n−2 times, thereby resulting in storage of n two-tuples, one for each of n respective slices, in the physical memory.

4. The method of claim 3 comprising the further step of summing the two-tuples.

5. The method of claim 4 wherein a correlation result with respect to a single slice defines a respective bandwidth, and wherein a consequence of the summing of the two-tuples is that any correlation result with respect to the reference frequency is of narrower bandwidth as compared with the respective bandwidth for a single slice.

6. The method of claim 3 comprising the further steps of:
selecting a first rotation rate associated with a first frequency offset from the reference frequency, the first rotation rate defining a first rotation angle;

for each of the n two-tuples, applying the first rotation angle n times to the two-tuple thus defining a rotated two-tuple corresponding to each of the two-tuples;

summing the rotated two-tuples corresponding to the each of the n two-tuples.

7. The method of claim 6 wherein the sum of the rotated two-tuples is indicative of a correlation with the first frequency.

8. The method of claim 6 comprising the further steps of:
selecting a second rotation rate associated with a second frequency offset from the reference frequency, the second rotation rate defining a second rotation angle;

for each of the n two-tuples, applying the second rotation angle n times to the two-tuple thus defining a rotated two-tuple corresponding to each of the two-tuples;

summing the rotated two-tuples corresponding to the each of the n two-tuples.

9. The method of claim 8 wherein the sum of the rotated two-tuples is indicative of a correlation with the second frequency.

10. The method of claim 8 wherein the first frequency is higher than the reference frequency and wherein the second frequency is lower than the reference frequency.

11. The method of claim 6, further comprising analyzing the first elements of the rotated two-tuples, and the second elements of the rotated two-tuples, to identify at least first and second phases among various time intervals, thereby detecting a phase-shift-keyed signal.

12. Apparatus for use with respect to a received electromagnetic signal, and with respect to a reference frequency, the apparatus comprising:
an analog front end disposed to receive the electromagnetic signal and having an output;

an analog-to-digital converter receiving the output of the analog front end, the analog-to-digital converter having an output, the output defining a resolution thereof;

computational means having a processor responsive to the output of the analog-to-digital converter for sampling the output of the analog-to-digital converter at a sampling rate, the sampling rate being at least as frequent as twice the reference frequency, the samples thereby defining a time series of samples;

the computational means disposed, for a number of samples exceeding the duration of one cycle at the reference frequency, the number of cycles defining a first slice, to carry out a first correlation calculation arriving at a first scalar correlation value relative to a first reference waveform at the reference frequency;

the computational means disposed to carry out a second correlation calculation defining the first slice, arriving at a second scalar correlation value relative to a second reference waveform at the reference frequency, the second reference waveform having a non-zero phase difference from the first reference frequency;

the first scalar correlation value with respect to the slice and the second scalar correlation value with respect to the slice defining a two-tuple for the slice;

the computational means disposed to store the two-tuple in a memory.

13. The apparatus of claim 12 wherein the number of samples amounts to at least two cycles at the reference frequency.

14. The apparatus of claim 13 wherein the number of samples amounts to at least four cycles at the reference frequency.

15. The apparatus of claim 14 wherein the number of samples amounts to at least eight cycles at the reference frequency.

16. The apparatus of claim 12 wherein the resolution is one-bit resolution.

17. The apparatus of claim 12 wherein the sampling rate is at least two times the reference frequency.

18. The apparatus of claim 12 wherein the first and second reference waveforms are each sinusoidal.

19. The apparatus of claim 18 wherein the first and second reference waveforms are in a phase relationship of sine and cosine.

20. The apparatus of claim 12 wherein the output of the analog-to-digital converter defines raw data, the apparatus further characterized by being disposed to discard each item of raw data after the first correlation calculation and the second correlation calculation have been carried out with respect to the item of raw data.

21. The apparatus of claim 12 wherein the analog front end comprises in sequence a first amplifier, a bandpass filter, and a second amplifier having an output, the output of the second amplifier coupled with the analog-to-digital converter.

\* \* \* \* \*